April 21, 1970 MASATOSHI TOYAMA ET AL 3,508,034

TIME MEASURING DEVICE FOR SPORTS

Filed June 22, 1967 18 Sheets-Sheet 1

INVENTORS
MASATOSHI TOYAMA
SHIRO SUGIYAMA
BY KAZUO ITO

Blum, Moscovitz, Friedman, Blum & Kaplan
ATTORNEYS

TIME MEASURING DEVICE FOR SPORTS

Filed June 22, 1967

INVENTORS
MASATOSHI TOYAMA
SHIRO SUGIYAMA
KAZUO ITO

BY

Blum, Moscovitz, Friedman, Blum & Kaplan
ATTORNEYS

INVENTORS
MASATOSHI TOYAMA
SHIRO SUGIYAMA
KAZUO ITO
BY
Blum, Moscovitz, Friedman, Blum & Kaplan
ATTORNEYS April 21, 1970 MASATOSHI TOYAMA ET AL 3,508,034

TIME MEASURING DEVICE FOR SPORTS

Filed June 22, 1967 18 Sheets-Sheet 4

INVENTORS
MASATOSHI TOYAMA
SHIRO SUGIYAMA
BY KAZUO ITO

Blum, Moscovitz, Friedman, Blum & Kaplan
ATTORNEYS

INVENTORS
MASATOSHI TOYAMA
SHIRO SUGIYAMA
KAZUO ITO
BY
Blum, Moscovitz, Friedman, Blum & Kaplan
ATTORNEYS

QUARTZ OSCILLATOR UNIT.

*INVENTORS*
MASATOSHI TOYAMA
SHIRO SUGIYAMA
KAZUO ITO
*BY* Blum, Moscovitz, Friedman, Blum & Kaplan
ATTORNEYS INVENTORS
MASATOSHI TOYAMA
SHIRO SUGIYAMA
KAZUO ITO
BY Blum, Moscovitz, Friedman, Blum & Kaplan
ATTORNEYS INVENTORS
MASATOSHI TOYAMA
SHIRO SUGIYAMA
KAZUO ITO
BY
Blum, Moscovitz, Friedman, Blum & Kaplan
ATTORNEYS INVENTORS
MASATOSHI TOYAMA
SHIRO SUGIYAMA
KAZUO ITO
BY
Blum, Moscovitz, Friedman, Blum & Kaplan
ATTORNEYS INVENTORS.
MASATOSHI TOYAMA
SHIRO SUGIYAMA
KAZUO ITO
BY
Blum, Moscowitz, Friedman, Blum & Kaplan
ATTORNEYS FIG. 8C
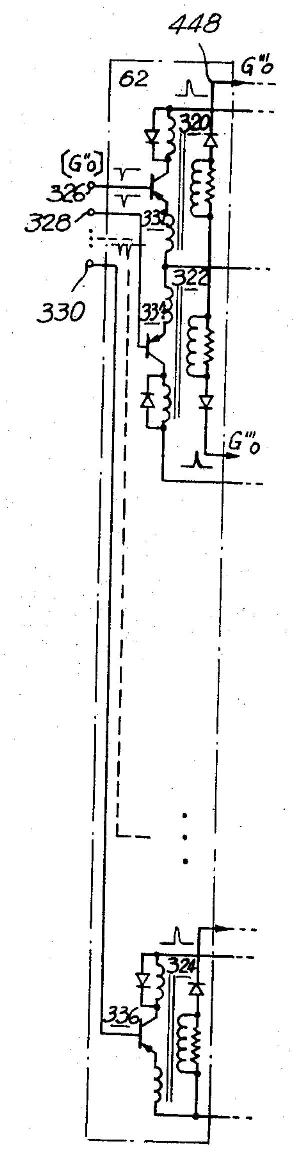
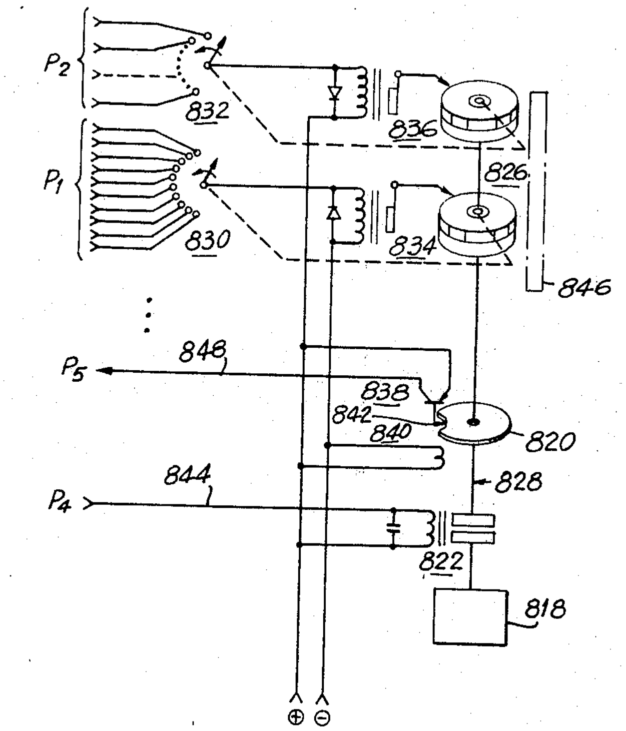
FIG. 6B
INVENTORS
MASATOSHI TOYAMA
SHIRO SUGIYAMA
BY KAZUO ITO
Blum, Moscovitz, Friedman, Blum & Kaplan
ATTORNEYS

INVENTORS
MASATOSHI TOYAMA
SHIRO SUGIYAMA
KAZUO ITO

BY Blum, Moscovitz, Friedman & Kaplan
ATTORNEYS

INVENTORS
MASATOSHI TOYAMA
SHIRO SUGIYAMA
KAZUO ITO
BY
Blum, Moscovitz, Friedman, Blum & Kaplan
ATTORNEYS

INVENTORS
MASATOSHI TOYAMA
SHIRO SUGIYAMA
KAZUO ITO

BY

Blum, Moscovitz, Friedman, Blum & Kaplan
ATTORNEYS

INVENTORS
MASATOSHI TOYAMA
SHIRO SUGIYAMA
BY KAZUO ITO

Blum, Moscovitz, Friedman, Blum & Kaplan
ATTORNEYS

April 21, 1970 MASATOSHI TOYAMA ET AL 3,508,034

TIME MEASURING DEVICE FOR SPORTS

Filed June 22, 1967 18 Sheets-Sheet 16

INVENTORS
MASATOSHI TOYAMA
SHIRO SUGIYAMA
KAZUO ITO
BY
Blum, Moscovitz, Friedman, Blum & Kaplan
ATTORNEYS INVENTORS
MASATOSHI TOYAMA
SHIRO SUGIYAMA
KAZUO ITO
BY
Blum, Moscovitz, Friedman, Blum & Kaplan
ATTORNEYS

DISPLAY UNIT II

INVENTORS
MASATOSHI TOYAMA
SHIRO SUGIYAMA
KAZUO ITO
BY
Blum, Moscovitz, Friedman, Blum & Kaplan
ATTORNEYS

United States Patent Office 3,508,034
Patented Apr. 21, 1970

1

3,508,034

TIME MEASURING DEVICE FOR SPORTS

Masatoshi Toyama, Ichikawa-shi, and Shiro Sugiyama and Kazuo Ito, Tokyo, Japan, assignors to Kabushiki Kaisha Daini Seikosha Continuation-in-part of application Ser. No. 378,558, June 29, 1964. This application June 22, 1967, Ser. No. 649,086
Claims priority, application Japan, July 17, 1963, 38/38,616
Int. Cl. G06m 3/06
U.S. Cl. 235—92 9 Claims

ABSTRACT OF THE DISCLOSURE

An electronic time measuring system for sports events has a quartz crystal oscillator for generating standard clock signals and an electronic counter for counting the time interval which elapses from the application thereto of a start signal. There is further provided a memory unit for storing the counting results for the various events and the order of arrival thereof, and a printing unit for printing out in the order of arrival, the results stored in the memory unit. There is further provided a control unit for selecting the mode of timing in accordance with the character of the sports event and a scanning unit for converting the start and stop signals for the various sports events as well as the standard time signal into the appropriate waveform for transmission to the control unit. The electronic time measuring system is contemplated for use in conjunction with an electric clock which is synchronized with the start and stop signals in order to provide a visual indication of the elapse time since the start of the event including means for transmitting such signals to the clock from the scanning unit in order to temporarily stop the clock at the termination of the event, and to reset the clock for the next event.

BACKGROUND OF THE INVENTION

This is a continuation-in-part application of our application for a Time Measuring Device for Sports, Ser. No. 378,558, filed June 29, 1964 and now abandoned.

The present invention relates to a time measuring system for sports events and more particularly to a high precision and high efficiency time measuring apparatus for timing, memorizing, displaying and printing the respective times of occurrence of the various time significant events occurring during the course of a sports event.

In presently used electronic time measuring devices for sports events, the standard time signal is converted into rotational motion by means of a synchronous motor. In such devices, the mechanical counter is triggered by a Start Signal and output of the mechanical counter is printed on recording paper for display. Often, in such presently used timing devices a separate electronic counting device is provided for each standard time signal to be counted. Furthermore, in such presently used timing devices, inaccuracies are introduced due to the finite time delay in activating the mechanical counter after the initial starting signal, together with a further time error due to the inertia of the printing hammer when it is activated by the counting apparatus.

It is therefore an object of the present invention to overcome the above inaccuracies in the presently used sports timing devices by providing a sports timing system having a high degree of accuracy and stability and is operative to display and print out the respective times of the time significant events occurring during the course of a sports event.

In accordance with the principles of the present in-

2 vention, there is provided a quartz crystal oscillator for generating standard clock signals, and an electronic counter for counting the time elapsed from the application thereto of a Start Signal, a memory unit for storing the counting results for various events and the order of arrival thereof, a printing unit for printing out in order of arrival, the results stored in the memory unit, a control unit for selecting the mode of timing in accordance with the character of the sports event, and a scanning unit for converting the start and stop signals for the various sports events as well as the standard time signal into appropriate waveforms for transmission to the control unit.

The apparatus of the present invention is contemplated for use with an electric clock which is synchronized with the start and stop signals, to provide a visual indication of the elapsed time since the start of the event and means for transmitting such signals to the clock from the scanning unit in order to temporarily stop the clock at the termination of the event, and to reset the clock for the next event. As hereinafter described the apparatus of the present invention is particularly suitable for use with photo-finish equipment.

The preferred embodiment of the present invention described herein is particularly suitable for use with an audio or mechanical device to indicate the start or stop of an event such as a starting pistol for providing the Start Signal, and a photo electric device for providing the Stop Signal for the sports event being timed.

The features of the invention which are believed to be novel are set forth with particularity in the appended claims. The invention itself, however, both as to its organization and method of operation, together with further objects and features thereof can best be understood with reference to the following description taken in conjunction with the accompanying drawings wherein:

BRIEF DESCRIPTION OF THE DRAWINGS

FIGS. 2A–1, 2B and 2A–2 are schematic circuits of the scanning unit of FIG. 2.

FIGS. 6A–1, 6A–2, 6B and 6C are schematic circuits of the memory control unit shown in FIG. 6.

FIGS. 8A–1, 8A–2, 8B–1, 8B–2, and 8C are schematic circuits of the printing control unit and printing unit shown in FIG. 8.

Figure 1:
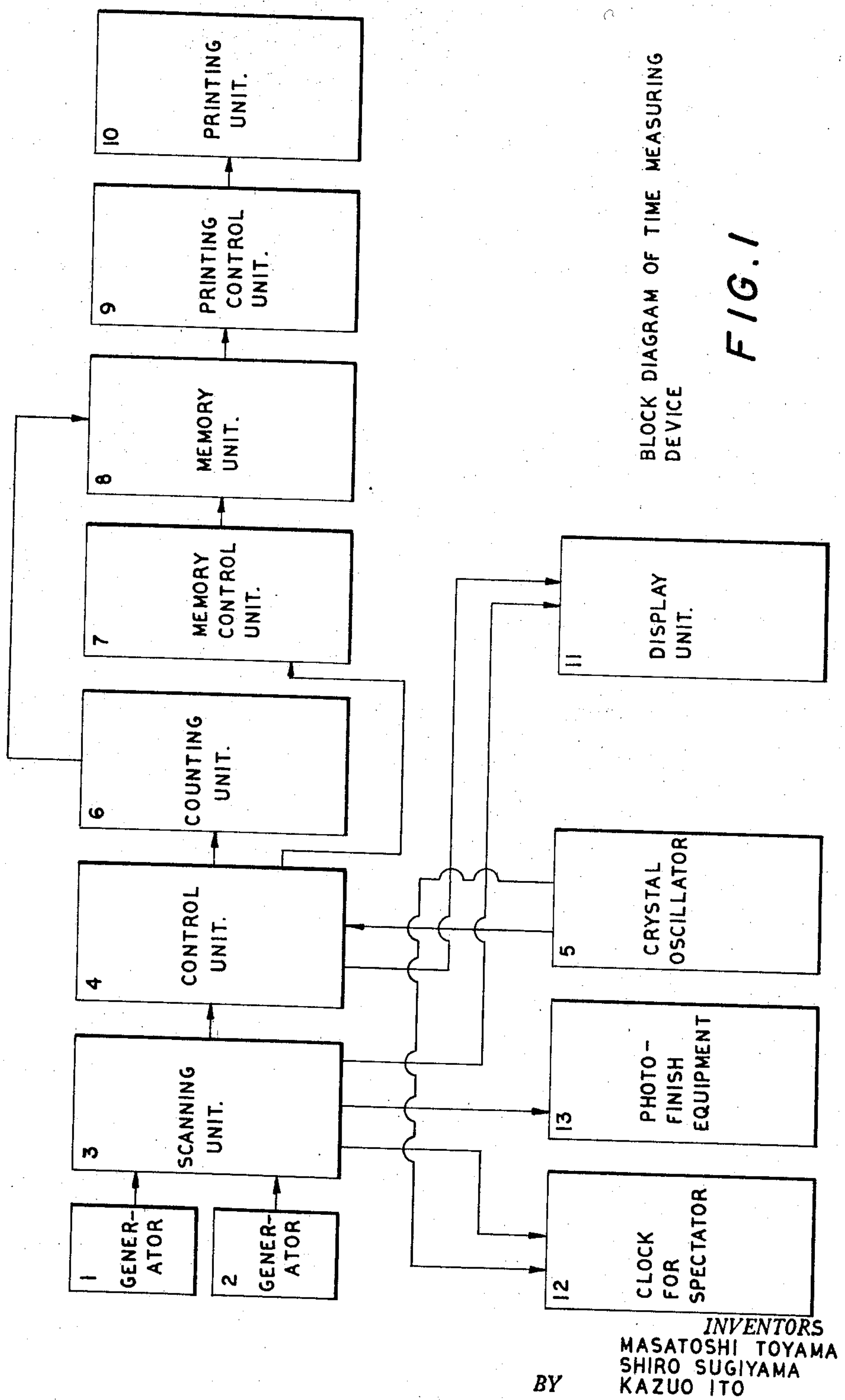
FIG. 1 is a block diagram showing the overall arrangement of the preferred embodiment of a time measuring system for sports events in accordance with the principles of the present invention.

Referring to the drawings, and FIG. 1 in particular, generator 1 is operative to provide the Starting Signal, and may comprise a starter pistol having electrical contacts to provide an electrical signal when the pistol is fired at the start of the event. Generator 2 may suitably comprise a photo-electric cell, or grip switch, for generating an electrical signal corresponding to the completion of a lap or termination of a particular sports event. Scanning unit 3 is operative to select the signal output of either generator 1 or generator 2, and to transmit said selected signal to control unit 4. The output of scanning unit 3 which transforms the signals applied thereto by generators 1 and 2 into suitable waveform for other components of the system, may be suitably connected to a time clock 12 to indicate the time of the event to the event to the assembled spectators, to photo-finish equipment 13 which photographs the termination of the sports event, and to display unit 11 for printing out the results of the particular sports event.

Counting unit 6 is operative to count the time interval between the Start and Stop Signals provided by control unit 4 and to feed information as to the times of various events to memory unit 8 for storage. Such information is stored in order of arrival and may suitably include information identifying the particular sports event being timed. Printing control unit 9 is operative to select particular stored information in memory unit 8 and to transmit such information to printing unit 10 for printing out. Oscillator 5 acts as a time reference standard and is operative to produce clock pulses for control unit 4, and to drive clock 12 which is to be viewed by the spectators.

Figure 2:
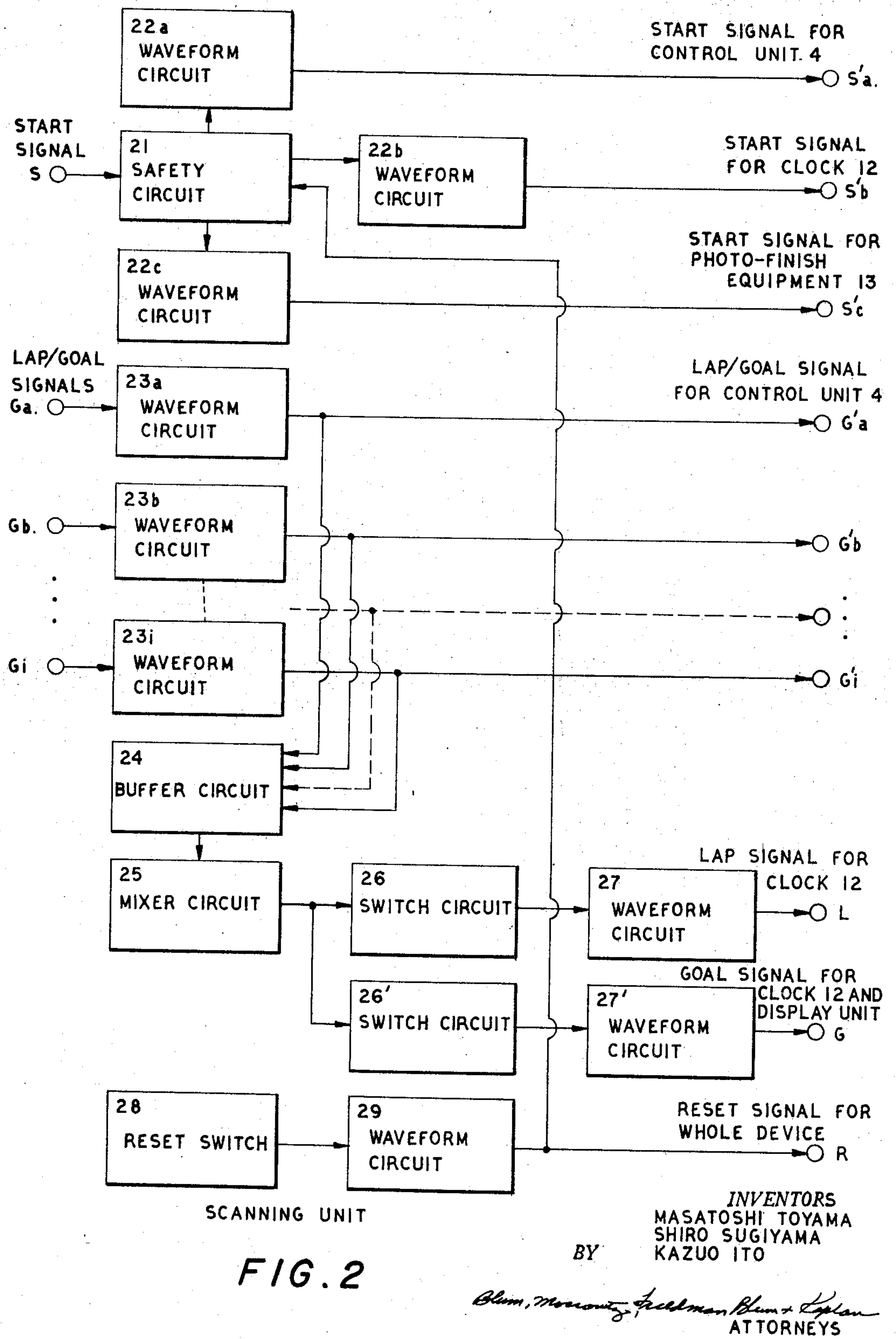
FIG. 2 is a block diagram of the scanning unit shown in FIG. 1.

Referring to FIG. 2, scanning unit 3 is shown in more detail, as comprising a safety circuit 21, and wave form shaping circuits 22*a*, 22*b* and 22*c* for providing suitably shaped output electrical signal, in response to the signals applied thereto by generator 1 and waveform shaping circuits 23*a* to 23*i* which upon the input thereto of the lap or goal signal from generator 2, provides suitable electrical signals for the various lap or goal times. Safety circuit 21 is operative to eliminate background noise or chattering which may possibly be caused by the contacts connected to the starter pistol, and which may otherwise be transmitted as a false signal. The output signals of circuits 22*a* to 22*c*, $S_a'$, $S_b'$, and $S_c'$ respectively, are transmitted to control unit 4, clock 12 and photo-finish equipment 13.

Scanning unit 3 further includes waveform shaping circuits 23*a* to 23*i* which upon the application thereto of signals $G_a$ to $G_i$ from generator 2 are operative to provide and to generate signals $G_a'$ to $G_i'$ for control unit 4. Photo electric devices may be suitably positioned on the lap line in a track race, or the goal line as the case may be to provide the respective lap and goal signals $G_a$ to $G_i$.

The output signals $G_a'$ to $G_i'$ from waveform circuits 23*a* to 23*i*, in addition to being fed to control unit 4, are also applied to a buffer circuit 24, the output of which is fed to mixer circuit 25, and thence to switch circuits 26 and 26′ whose output is fed to waveform circuits 27 and 27′, for application to spectator clock 12 and display unit 11 respectively. The lap signal, L, provided by waveform circuit 27 is applied directly to spectator clock 12 and is operative to make the second hand of clock 12 to stop at the instant of application of the lap signal L, thereto. The goal signal G provided by waveform circuit 27′, is applied directly to the spectators clock 12 and display unit 11, thereby causing the second hand of clock 12 to stop, and unit 11 to display the timed result. A reset switch 28 is provided to reset the timing circuitry back to its initial position, after the completion of an event. The reset signal R, provided by reset switch 28, is applied to waveform circuit 29, the output of which is applied to safety circuit 21, control unit 4, spectator clock 12, and the photo finish equipment 13 thereby resetting the complete system.

Figures 1, 2A:
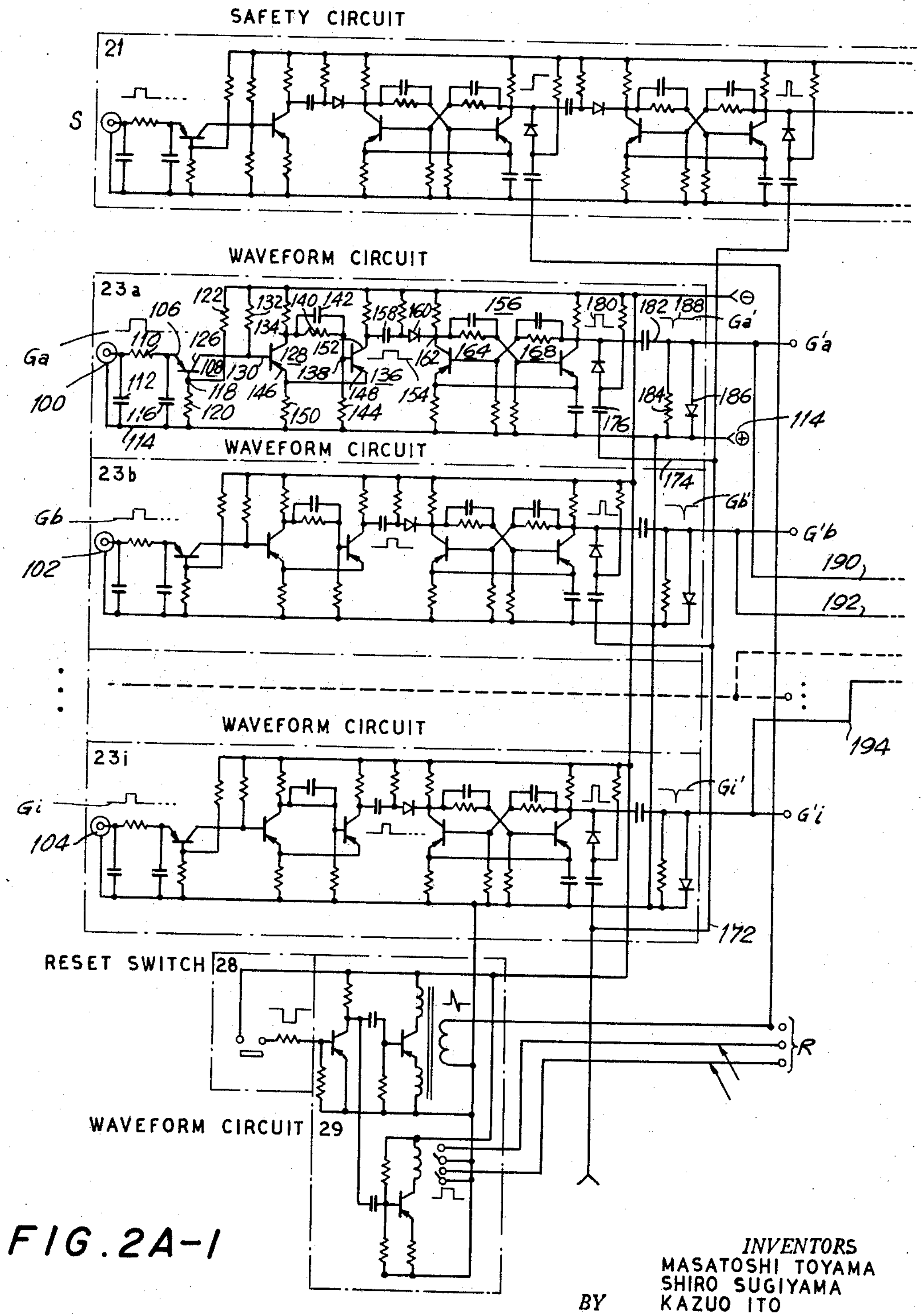

Buffer circuit 24 is operative to prevent the mutual interference of the lap and goal signals $G_i$ in the following manner. Input lap and goal signals $G_a$, $G_b$ . . . $G_i$, from each input terminal are applied to waveform shaping currents 23*a*, 23*b* . . . 23*i* at input terminals 100, 102 and 104 respectively. As shown in FIG. 2A, input signals $G_i$ are positive rectangular pulses and output signals $G_2'$ are negative spikes.

Waveform circuits 23*a*, 23*b* . . . 23*i* are essentially similar, and hence only circuit 23*a* will be described herein.

Input signal $G_a$ is applied into the emitter 106 of transistor 108 by means of input resistor 110. Input capacitor 112 is connected between input terminal 100 and positive supply line 114 with input capacitor 116 being connected between emitter 106 and supply line 114. Base 118 which is connected to supply line 114 through resistor 120, with resistor 122 being connected between base 118 and negative supply lead 124. The output of transistor 108 is taken at collector 126 and is applied to the input of first H amplifier transistor 128 at base 130, which is connected to negative supply lead 124 through resistor 132. The output of transistor 128 at collector 134, is applied to the input of second stage transistor 136 at its base 138, through the parallel arrangement of coupling resistor 140 and coupling capacitor 142, with base 138 being connected to positive supply lead 114 through input transistor 144. Both emitters 146 and 148 are connected together through common emitter transistor 150 having its other end connected to positive supply lead 114.

The output of transistor 136 at collector 152 is shown by waveform 154, which is applied to bistable multivibrator 156 by means of coupling capacitor 158 in series with diode 160 which has its cathode connected to the collector 162 of switching transistor 164. The output of bistable multivibrator circuit 156 is provided at collector 166 of switching transistor 168. A 1 kilocycle clock signal is provided from oscillator 5 by means of leads 170, 172, 174, capacitor 176 in series with diode 178 which has its cathode connected to collector 166, to output waveform 180 provided at collector 166, is differentiated by means of capacitor 182 and resistor 184 which is connected to positive supply lead 114 the positive spike representing the leading edge of waveform 180 is shunted to positive supply lead 114, by means of diode 186, thereby leaving a negative going spike shown by waveform 188 which constitutes output signal $G_a'$.

The signals $G_a'$, $G_b'$ . . . $G_i'$ are applied to buffer circuit 24 by means of leads 190, 192 and 194 respectively. Buffer circuit 24 comprises a diode 196 having its cathode connected to input lead 190, and its anode connected to resistor 198, for each input signal $G_a'$, $G_b'$ . . . $G_i'$.

The output of buffer circuit at 24 is a series of negative going spikes as shown by waveform 196 which is applied to mixer circuit 25 by coupling capacitor 198 which is connected between the conjunction of the anodes of output diodes 200, 202 and 204, and resistor 206, and base input 208 of transistor 210. The signals $G_a'$, $G_b'$, . . . $G_i'$ are transmitted through buffer circuit 24, which is operative to pass signals in one direction only, by virtue of e.g. diodes 196 and 200, thereby preventing there mutual interference of each lap signal or goal signal $G_a$, $G_b$ . . . $G_i$, with the mixer circuit being operative to receive these signals and to transmit them into switch circuits 26 and 26′.

Figures 2, 2A, 2B:
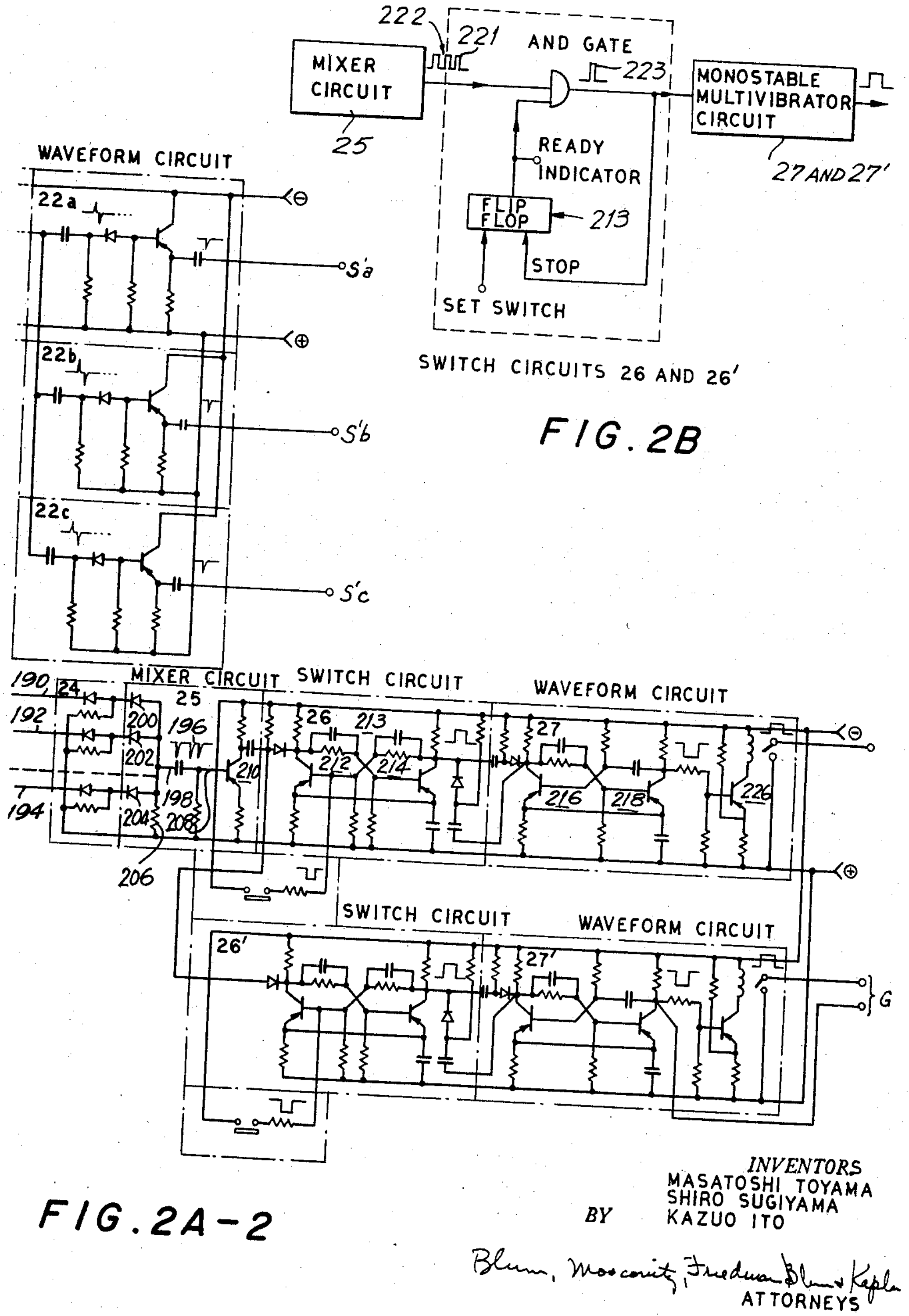

The operation of switch circuit 26 and waveform circuit 27 (which is analogist to switch circuit 26′ and waveform circuit 27′) may be better understood by reference to the partial block diagram of FIG. 2B in conjunction with the schematic diagram of switch circuits 26 and 26′ and waveform circuits 27 and 27′ as shown in FIG. 2A. As shown in FIGS. 2A and 2B, switch 26 comprises a bistable flip flop circuits including switching transistors 212 and 214. Waveform circuit 27, as indicated in FIG. 2B, comprises a monostable multivibrator circuit including switching transistors 216 and 218.

If the lap set switch or the goal set switch are kept in the READY condition before the first competitor passes the lap or goal line, gate 220 is in the open condition, and when the competitors pass the lap or goal line, a number of pulses corresponding to the number of competitors are produced by mixer circuit 25 as shown by waveform 222. In the first pulse of the pulse series of waveform 222 passes through AND GATE, flip flop circuit 213 changes its state thereby closing AND GATE 220, and thereby insuring that only the first pulse 221 of pulse series 222 can be transmitted through AND GATE 220. The pulse 223 passing through AND GATE 220 is applied to monostable multivibrator circuit 27 to widen pulse 223 to provide output pulse 224 for driving transistor 226 to stop the spectator clock in display unit 11. Switch circuit 26′ and waveform circuit 27′ are operative in a similar manner to that described above with respect to switch circuit 26 and waveform circuit 27 respectively.

Figure 3:
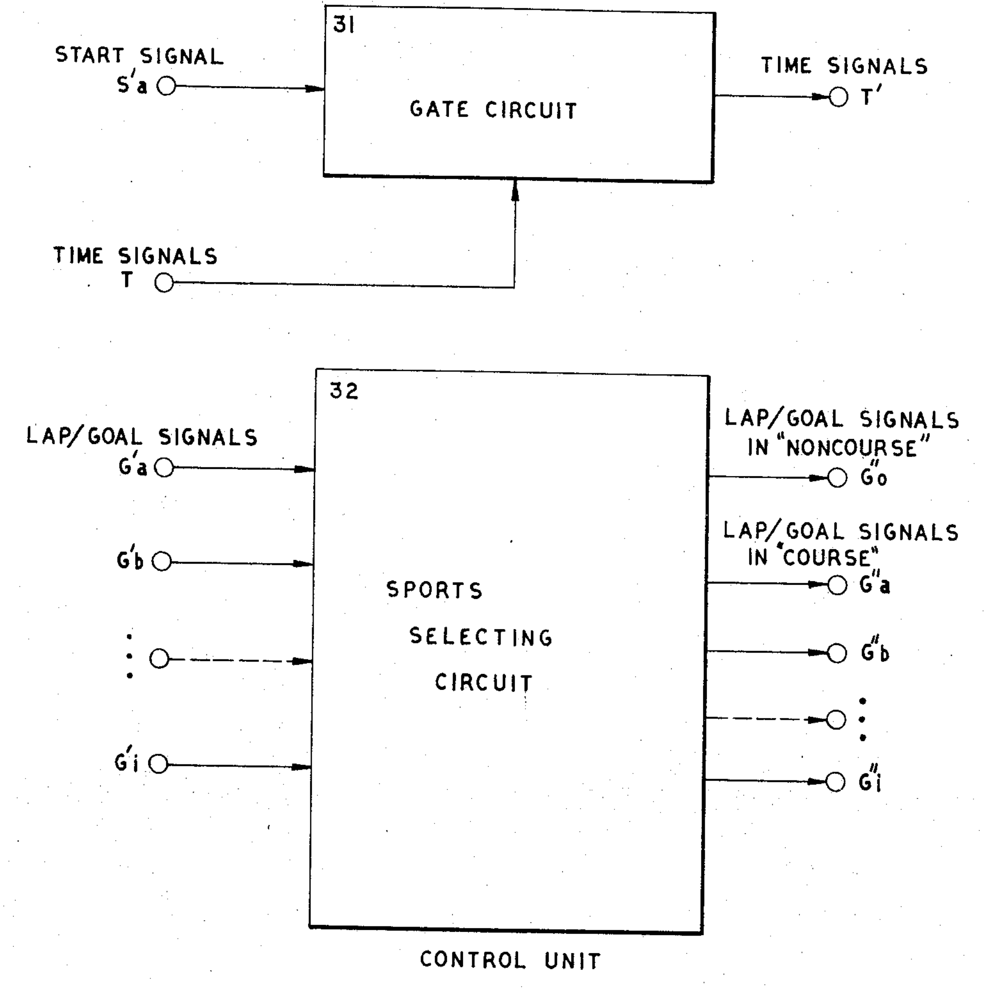
FIG. 3 is a block diagram of the control unit shown in FIG. 1.

Referring to FIG. 3 there is shown the control unit 4 as comprising a gate circuit 31 and a sports selecting circuit 32. Gate circuit 31 is operative, upon the application thereto of a time signal T, and start signal $S_a'$, to generate an output time signal T′ for counting unit 6, until the next reset signal, R, is applied thereto. Sports selecting circuit 32 is operative to select the type of sports event to be performed, and upon the application thereto of a lap or goal signal $G_a'$ to $G_i'$, to provide output signals $G_o''$ or $G_a''$ to $G_i''$ memory control unit 7 for storage in memory unit 8. If the nature of the sports event, such as a track race, is such as to require the indication of the order of arrival and time of arrival for each competitor, sports selecting circuit 32 is present to its "noncourse" position and will receive one of the signals $G_a$ to $G_i'$ from scanner 3 to provide the output signal $G_o''$ at its output for memory control unit 7. If, however, the sports event is such that requires information as to the course number, order of arrival and times for each competitor as in the case of a swimming meet, selecting circuit 32 is present to its "course" position to provide at its multiple output, signals $G_a''$ to $G_i''$ for memory control unit 6.

Figure 3A:
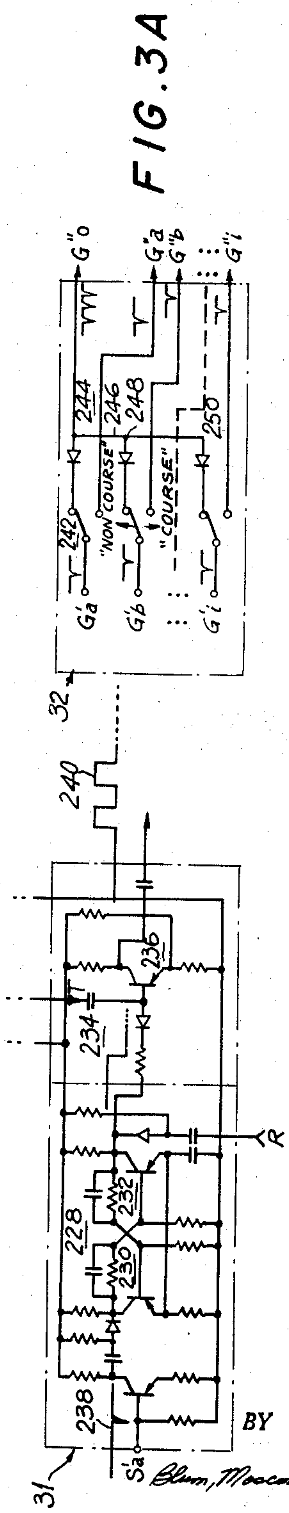
FIG. 3A is a schematic diagram of the control unit shown in FIG. 3.

Referring to FIG. 3A, there is shown in schematic diagram form gate circuit 31, and sports selecting circuit 32, depicted in block diagram form in FIG. 3. Gate circuit 31 comprises a bistable flip flop circuit 228 including switching transistors 230 and 232, and AND gate circuit 234 including gating transistor 236. Flip flop circuit 228 is Reset by Reset pulse provided by waveform circuit 29 in scanning unit 3, and bistable circuit 228 reverses its condition upon the application thereto of start signal $S_a'$ provided by waveform circuit 22A, as shown by waveform 238. As shown in FIG. 4A, and FIG. 3A, AND gate circuit 234 receives a Time Signal (e.g. 1 kc.) from signal conversions circuit 43, to provide a Time Signal out T′, depicted as waveform 240, only when flip flop circuit 228 is in the reversed state as provided by Start Signal $S_a'$.

Accordingly, output Time Signal (e.g. 1 kc.), is generated at the instant when Start Signal is provided and continues until the instant when Reset Signal R is applied.

Sport selecting circuit 32 comprises switch arrangement 42 and OR circuit 244 including the parallel arrangement of diodes 246, 248 and 250 corresponding to input signals $G_a'$, $G_b'$ . . . $G_i'$. Switch arrangement 242 distributes the lap or goal signals $G_a'$, $G_b'$ . . . $G_i'$ form waveform circuit 23A, 23B, . . . 23I for the case of "non-course" and "course" events, with OR circuit 244 mixing the input signals from the one or more input lines of signal $G_a'$, $G_b'$ . . . $G_i'$, for the case of a "non-course" event, and accordingly, in the case of a "non-course" event, output signals $G_o''$ are produced from a single terminal as shown in FIG. 3A. Further as shown in FIG. 3A, in the case of "course" events, input signals $G_a'$, $G_b'$ . . . $G_i'$ are transmitted independently.

Figure 4:
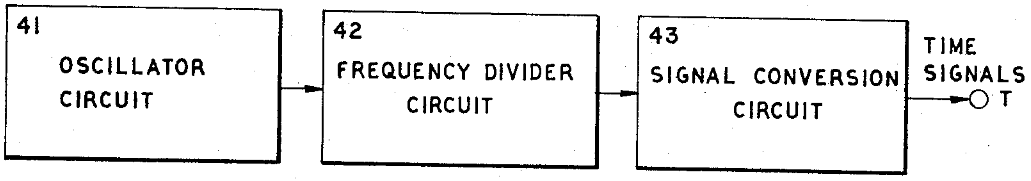
FIG. 4 is a block diagram of the clock signal generator shown in FIG. 1.
Figure 4A:
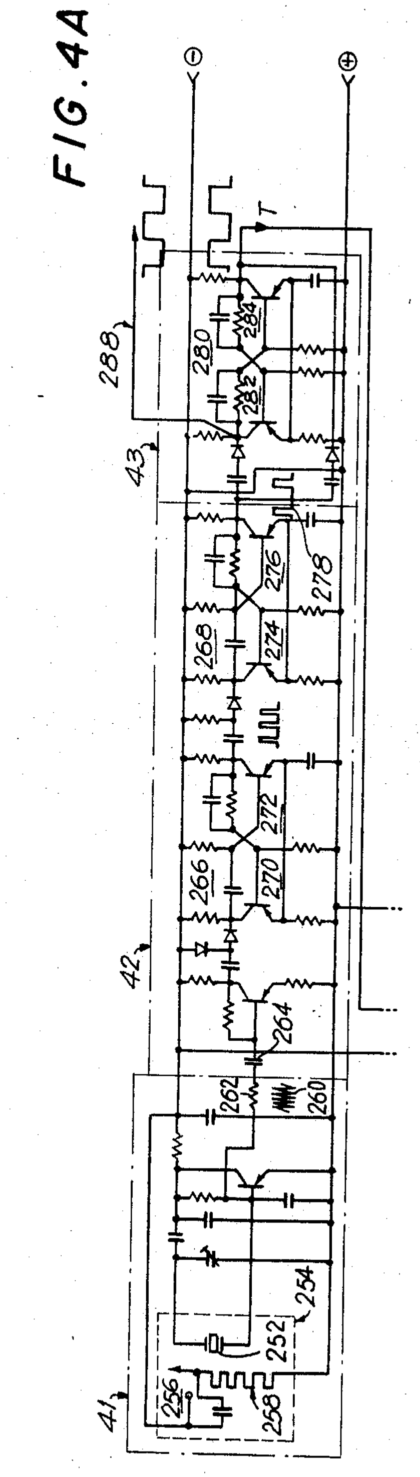
FIG. 4A is a schematic diagram of the clock signal generator shown in FIG. 4.

Referring to FIG. 4, there is shown oscillator 5 which acts as a clock pulse source, as comprising a crystal oscillator circuit 41 followed by frequency divider 42 and signal conversion circuit 43. Circuit 41 is preferably thermostatically controlled in order to provide a stable frequency output for frequency divider circuit 42. The high frequency pulse output of oscillator circuit 41 is scaled down by frequency divider circuit 42, to pulses at a repetition rate of 1000 pulses per second. Signal conversion circuit 43 converts the pulse output of divider circuit 42 into suitable pulse time signals T, at 1000 pulses per second for application to control unit 4.

Referring to FIG. 4A, there is shown in schematic diagram form oscillator circuit 41, frequency divider circuit 42, and signal conversion circuit 43, depicted in block diagram form in FIG. 4. Quartz crystal 252 of oscillator circuit 41 is disposed in an oven 254 which is maintained at 60° C. by means of thermostat 256 and heater filament 258. By virtue of the thermostatic control of crystal 252, oscillator circuit 41 is operative to produce a stable frequency output, shown by waveform 260. Oscillator output 260 is applied to frequency divider circuit 42 by means of coupling resistor 262 and coupling capacitor 264. Frequency divider circuit 42 comprises first and second monostable multivibrator circuits 266 and 268. Multivibrator circuit 266 comprises switching transistors 270 and 272, while monostable multivibrator circuit 268 comprises switching transistors 274 and 276. Frequency divider circuit 42 is operative to divide the frequency of the oscillator circuit output 260 from 100 kc. to 200 kc. as depicted by output waveform 278. Signal conversions circuit 43 comprises a bistable flip flop circuit 280 including switching transistors 282 and 284, and is operative to convert the output of frequency divider circuit 42 i.e. pulse train 278, into rectangular waveform 286 taken at the collector of switching transistor 284 which is Time Signal having a frequency of 1 kc. The other output of flip flop 280 is taken from the collector of transistor 282 by means of lead 288 to provide an output clock pulse of 1 kc. i.e. waveform 290, which is 180° which is out of phase with respect to waveform 286.

Figure 5A:
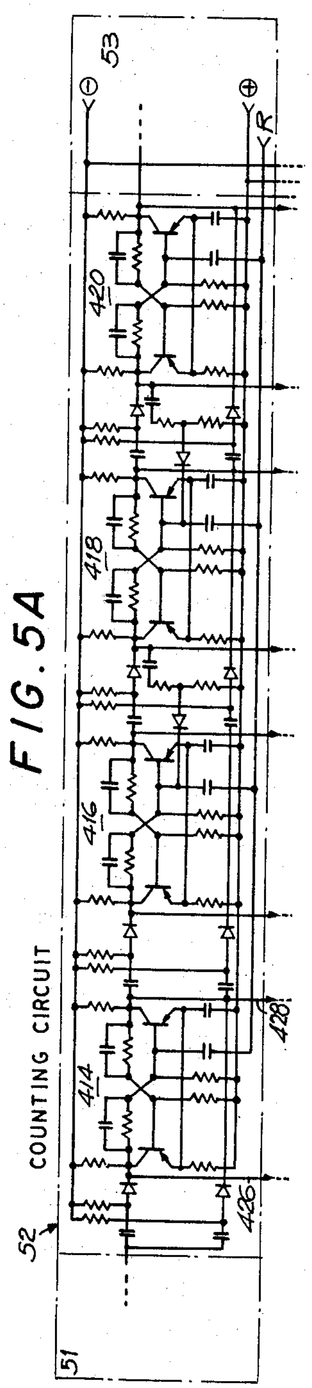
FIG. 5A is a schematic diagram of the counting unit shown in FIG. 5.
Figure 5:
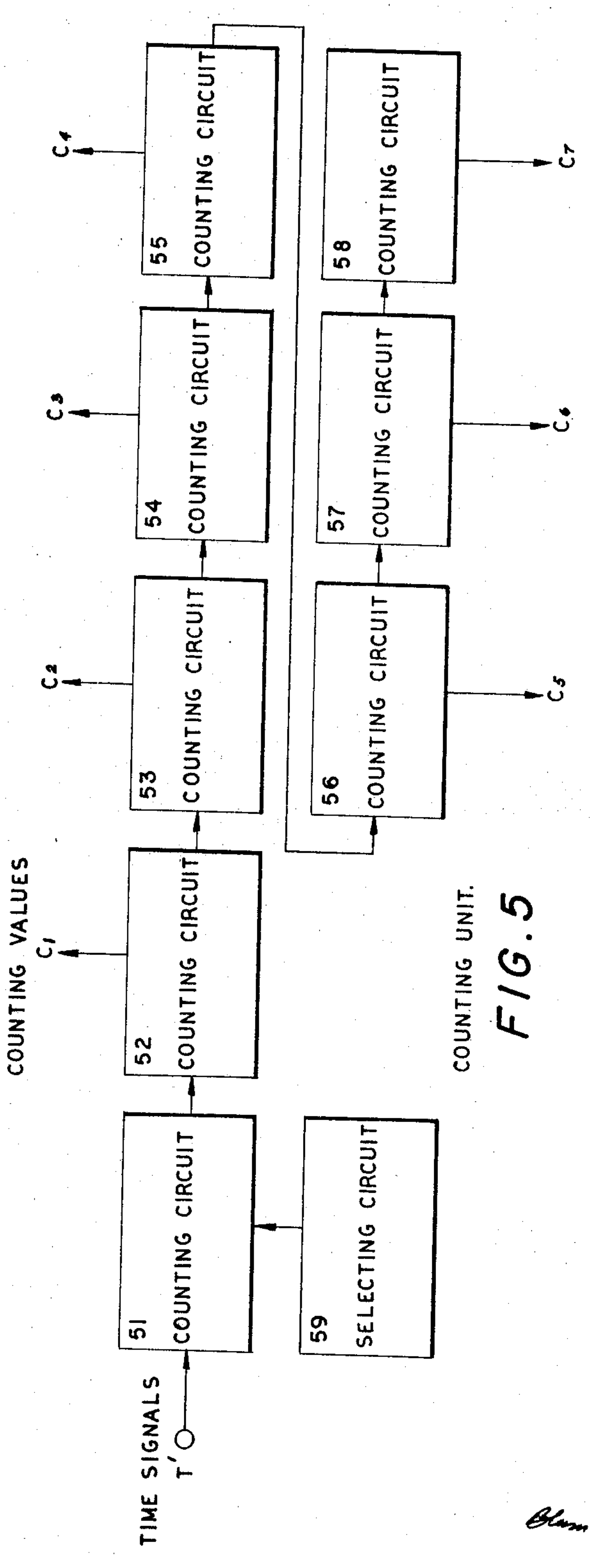
FIG. 5 is a block diagram of the counting unit shown in FIG. 1.

Referring to FIG. 5 there is shown the counting unit 6 as comprising a number of counting circuits 51–58 to provide a decimal and hexanary counting system, operative to count the pulses obtained from control unit 4, and including a selecting circuit 59. Counting circuits 51 to 55 respectively count thousandths, hundredths, tenths, full units and tens of seconds, whereas circuits 56 and 57 count full units and tens of minutes, and circuit 58 counts full units of hours with counting circuits 52 to 58 respectively providing signals $C_1$ to $C_7$ for memory unit 8. Counting unit 6 is thus operative to count the Time Signals T provided by oscillator 5 via control unit 4, to an accuracy of one thousandth of a second.

The electronic circuitry comprising counting unit 6 may contain inaccuracies, in the order of plus or minus one thousandth of a second, when the start signal is applied thereto. Accordingly, selecting circuit 59 may be pre-set to count fractions of five thousandths of a second and over, as one hundredth of a second, and drop the remainder. Thus counting unit 6 maintains an accuracy of one thousandth of a second.

Figure 6:
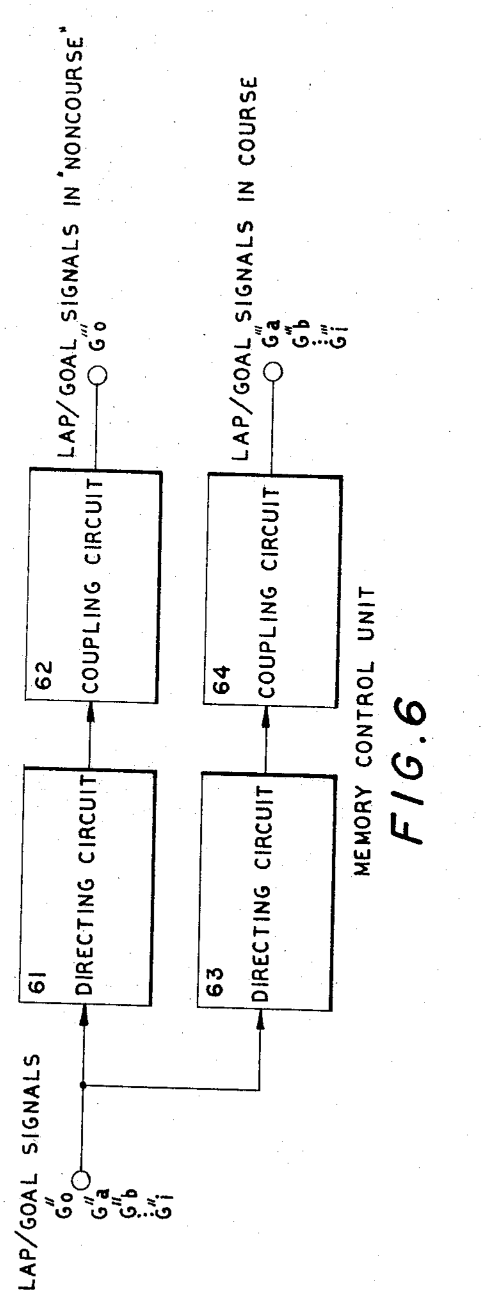
FIG. 6 is a block diagram of the memory control unit shown in FIG. 1.

Referring to FIG. 6, there is shown memory control unit 7 as comprising two branches, one of which is adapted for sports events discriminated by the order of arrival i.e. "non-course," which includes directing circuit 61 and 62, and the other branch which is adapted for sports events discriminated by course i.e. "course," including directing circuit 63 and coupling circuit 64. Directing circuit 61 is operative to send to memory circuit 8, the instantaneous counted value in accordance with the sequence of the lap and goal signals obtained from control unit 4 in accordance with the order of arrival from coupling circuit 62. Directing circuit 63 is operative to send to memory circuit 8 via coupling circuit 64, the instantaneous counted value in accordance with the lap and goal signals containing the course number information. Thus, directing circuit 61 having signal $G_o''$ applied at its input, provides an output signal $G_o'''$ to memory circuits 71 to 79 by means of coupling circuit 62. Also, directing circuit 63 which has as its input, signal $G_a''$ to $G_i''$, generates output signals $G_a'''$ to $G_i'''$ which are respectively distributed by coupling circuit 64 to each of the memory circuits 71 to 79 in accordance with the course number of each competitor.

Figures 1, 6A:
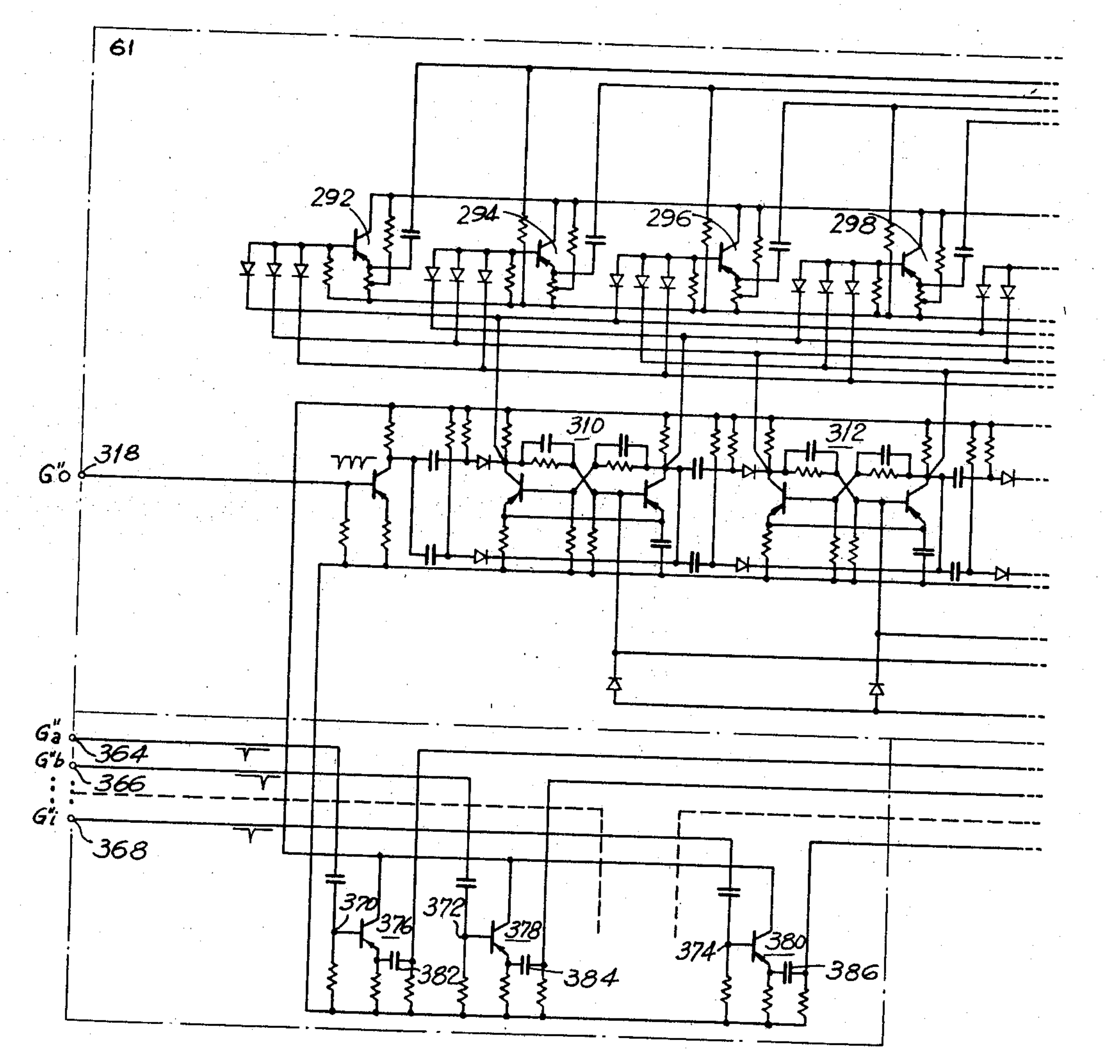
Figures 2, 6A:
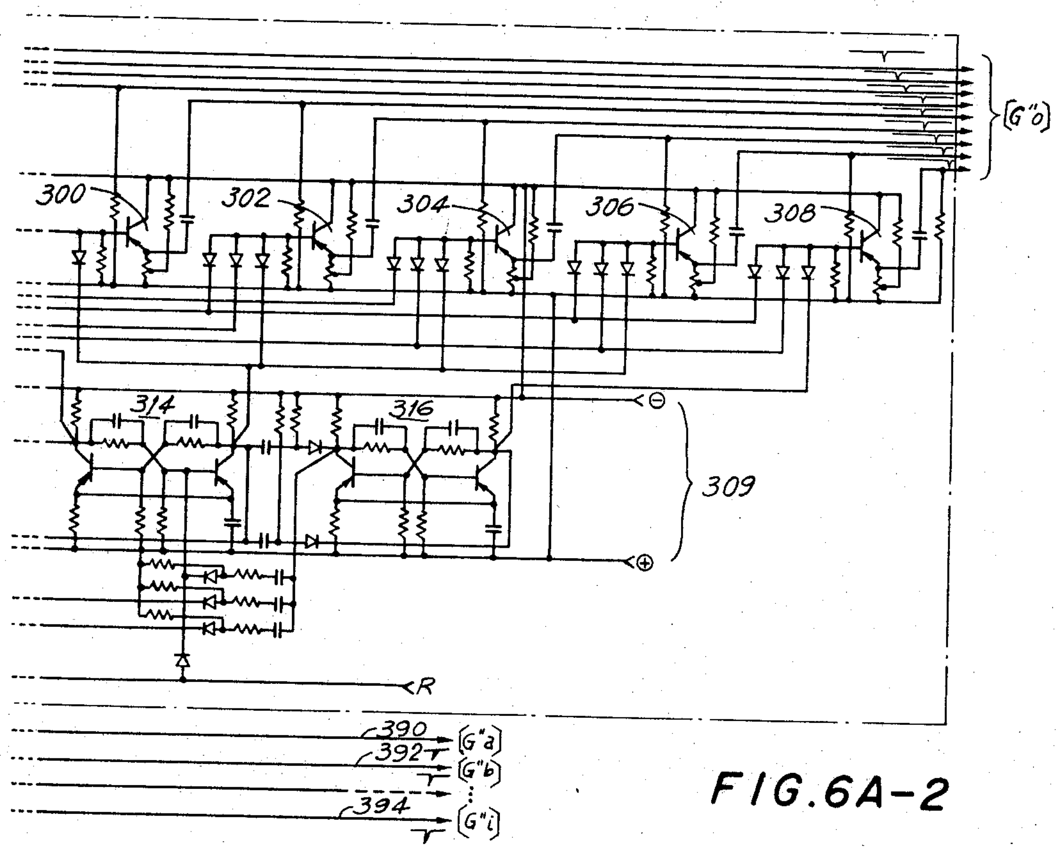

As shown in FIG. 6A, directing circuit 61 comprises a 9 stage cyclic counter circuit comprising transistors 292, 294, 296, 298, 300, 302, 304, 306 and 308. Directing circuit 61 further comprises a distributor circuit portion 309, which is operative for "non-course" events, and includes bistable flip flop circuits 310, 312, 314, and 316. Distributor circuit 309 is operative to receive input signals $G_o''$ from sports selecting circuit 32, at input terminal 318, and to distribute the signals in the order of their generation, i.e. in the order of arrival of competitors, which in conjunction with the cyclic counter portion of directing circuit 61, being operative to provide output pulses $G_o''$ on the nine output lines as shown in FIG. 6A.

Coupling circuit 62 shown in FIG. 6B, comprises a series of blocking oscillator circuits 320, 322 . . . 324, having input terminals, 326, 328 . . . 330, respectively, for the application thereto of signal ($G_o''$). Blocking oscillator circuits 320, 322 . . . 324 respectively comprise transistors 332, 334 . . . 336. Coupling circuit 62 is operative to excite memory circuits 71, 72 . . . 79 successively in order of arrival of input pulses ($G_o''$) at input terminals 326, 328 . . . 330. By means of output pulses $G_o'''$ which are applied to the memory circuits. Memory circuits 71, 72 . . . 79, each comprise 4 bistable flip flop circuits. Memory circuit 71 comprises flip flop circuit 338 including switching transistors 340 and 342; flip flop circuit 346 includes switching transistors 348 and 350; flip flop circuit 352 includes switching transistors 354 and 356; and flip flop circuit 358 includes switching transistors 360 and 362. Memory circuits 72–79 have a similar arrangement of bistable flip flop circuits as those described with respect to memory circuit 71.

Directing circuit 63 which function in the case of a "course" event comprises a series of emitter follower circuits for performing the function of each circuit. Directing circuit 63 has signal $G_a''$, $G_b''$ . . . $G_i''$ applied to its multiple input terminals 364, 366 . . . 368, which are respectively connected to input bases 370, 372 . . . 374, of transistors 376, 378 . . . 380. The outputs ($G_a''$), ($G_b''$) . . . ($G_i''$) are taken from the respective emitters of transistors 332, 334 . . . 336 by means of coupling capacitors 382, 384 . . . 386 and corresponding output leads 390, 392 . . . 394, respectively.

Figure 6C:
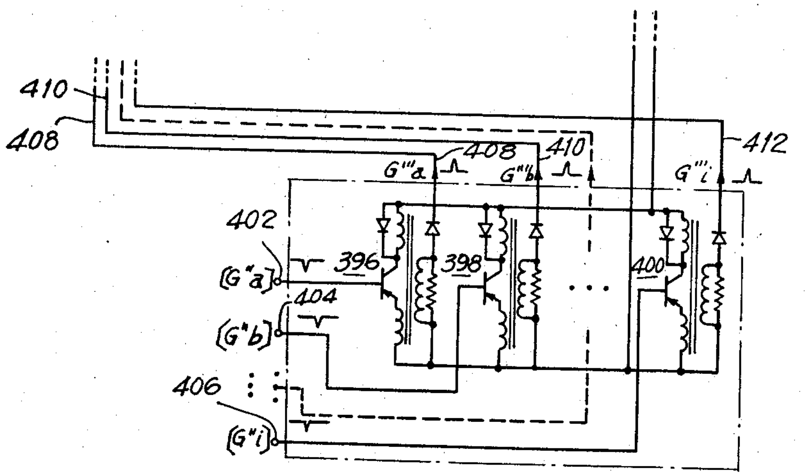

Referring to FIG. 6C coupling circuits 64 is seen to comprise a series of blocking oscillator circuits 396, 398 . . . 400 having input terminals 402, 404 . . . 406 for the application thereto of input signals ($G_a''$), ($G_b''$) . . . ($G_i''$). Coupling circuit 64 is operative to excite memory circuits 71, 72 . . . 79 in the order of the application thereto of input signals ($G_a''$), ($G_b''$) . . . ($G_i''$), and corresponding to the course numbers. The aforementioned series of blocking oscillators is operative to produce output pulses $G_a'''$, $G_b'''$, $G_i'''$ at coupling circuit output leads 408, 410 . . . 412 respectively.

Figure 7:
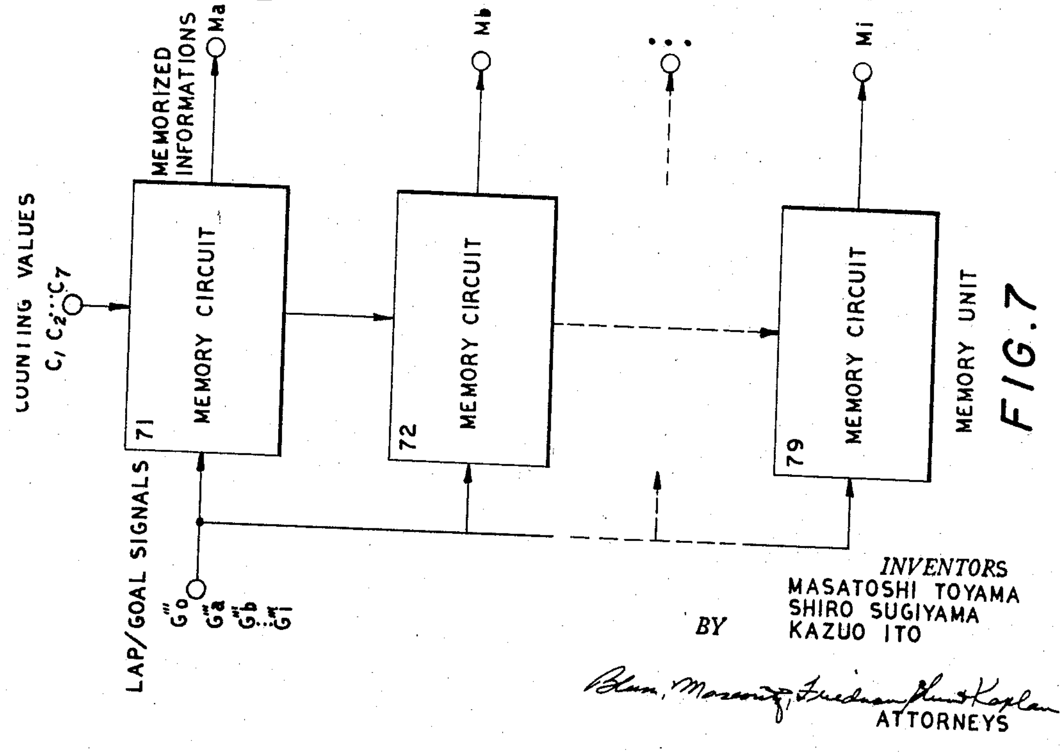
FIG. 7 is a block diagram of the memory unit shown in FIG. 1.

Referring to FIG. 7 there is shown memory unit 8 as comprising memory circuit 71 to 79, i.e. arranged for nine competitors, although additional memory circuits may be provided for additional competitors. Memory circuits 71 to 79 are operative to instantaneously memorize counting values $C_1$ to $C_7$ provided by counting circuits

52 to 58, and also the orders of arrival or the course numbers, as the case may be, provided by signals $G_o'''$ or $G_a'''$ to $G_i'''$ which correspond to the lap or goal signals from memory control unit 7. Memory circuits 71 to 79 are also operative to store information $M_a$ to $M_i$ for the printing control unit 9.

If the signals $G_o'''$ provided by control unit 4, selected to "non-course" and memory control unit 7 are greater than the numbers of the memory circuits 71 to 79, the signals $G_o'''$ are cyclically rotated from the circuit 71 to 79 and back again to 71 to 79 by coupling circuit 62 of memory control unit 7. When control unit 4 is selected to "course," the signals $G_a'''$ to $G_i'''$ are directed to memory circuits 71 to 79 by coupling circuit 64 of memory control unit 7.

Referring to FIGS. 5 and 5A, counting circuit 52, which is similar to the other counting circuits 53 to 58, is shown in schematic form in FIG. 5A, showing its circuit connections to memory circuit 71, and particularly the application of its output counting value $C_1$ to memory circuit 71, as well as memory circuits 72 to 79.

As shown in FIG. 5A, counting circuit 52 comprises bistable flip flops 414, 416, 418, and 420 in cascade arrangement. The $C_1$ counting value provided by flip flop 414 is produced at the collectors of switching transistors 422 and 424 respectively and is applied to the base terminals of transistors 342 and 340 respectively by means of the following coupling circuits. Output leads 426 and 428 are respectively connected to the collectors of transistors 422 and 424, and are operative to apply the output counting value pulse $C_1$ to the chain of bistable flip-flops in the chain of memory circuits 71 to 79 i.e. the first flip flop of the chain in each of the memory circuits 71 to 79. For example, lead 426 is connected to one end of resistor 430, the other end of which is serially connected to diode 432, which is connected to the base terminal of switching transist 342. Additionally, the output of blocking oscillator 320 i.e. $G_o'''$ is connected to the junction of resistor 430 and diode 432 by means of capacitor 434. In a similar fashion the other output of flip flop 414 at output lead 428 is connected to the base of transistor 340. Similarly, output lead 426 is connected to switching transistors 436 to 438 of flip flop circuits 440 and 442, while the other output lead 428 is similarly connected to the opposite switching transistors 444 to 446. As shown in FIG. 5A, the other flip flop counting circuit 416, 418, and 420 are similarly connected to the corresponding chain of flip flops of memory circuits 71 to 79. The above described counting circuits e.g. counting circuit 52 provides counting units of 1/100 second.

Figure 7A:
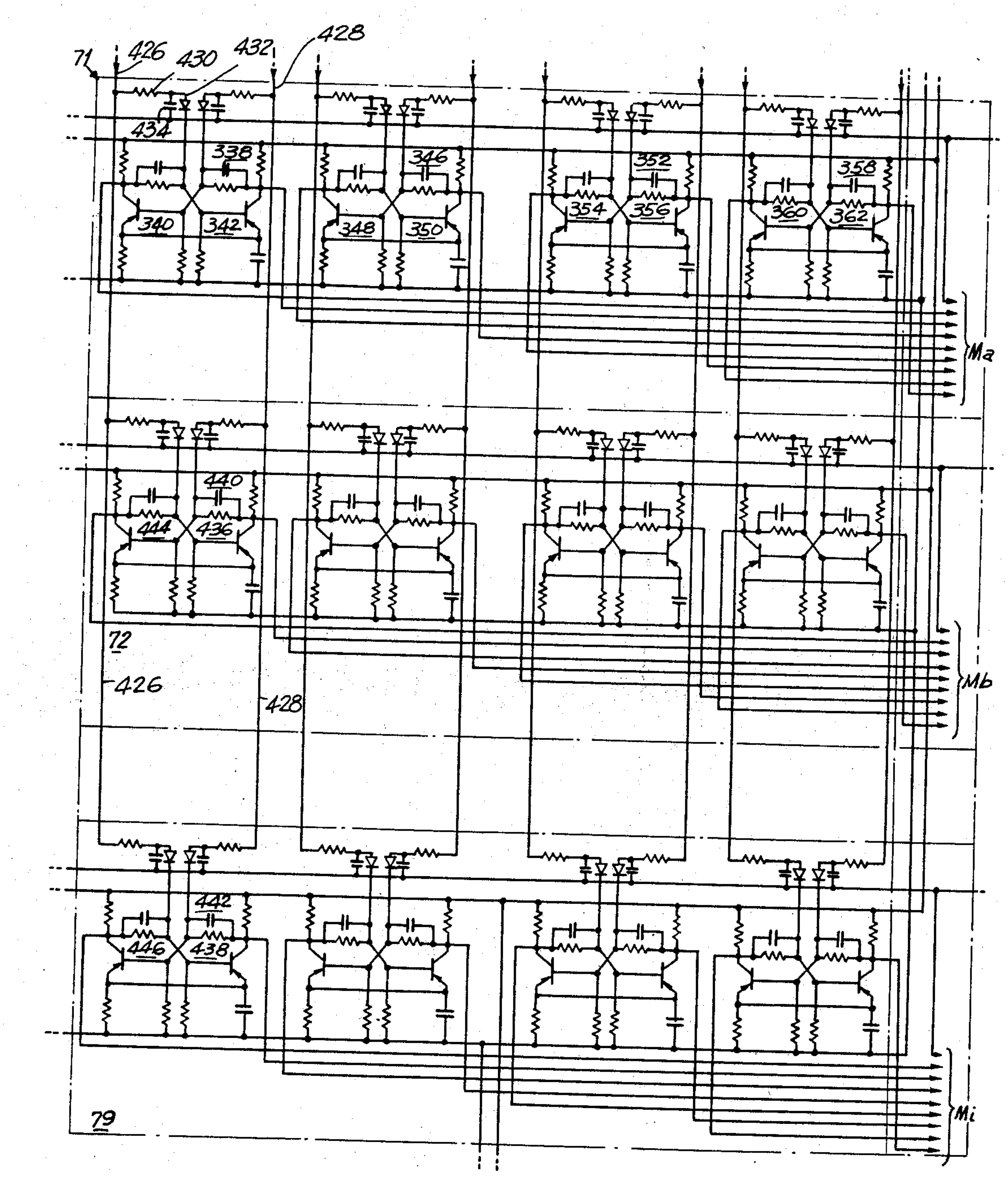
FIG. 7A is a schematic circuit of the memory unit shown in FIG. 7.

Memory circuit 71, for example, receives signal $G_o'''$ from coupling circuit 62 by means of lead 448, or signal $G_a'''$ from coupling circuit 64 by means of lead 408, in order to memorize the time of arrival of the first arrival in the case of a "non-course" event, and the time of arrival of the competitor in the first course in the case of a "course" event, by selectively varying the states of the flip-flops in the memory circuit, and to thereby generate output signal $M_a$, as shown in FIGURE 7A. Memory circuit 72, is operative in a similar manner to that described above with respect to memory circuit 71, to memorize the arrival times of the second arrival or the competitor in the second course, and to thereby generate output signal $M_b$, as shown in FIG. 7A.

Figure 8:
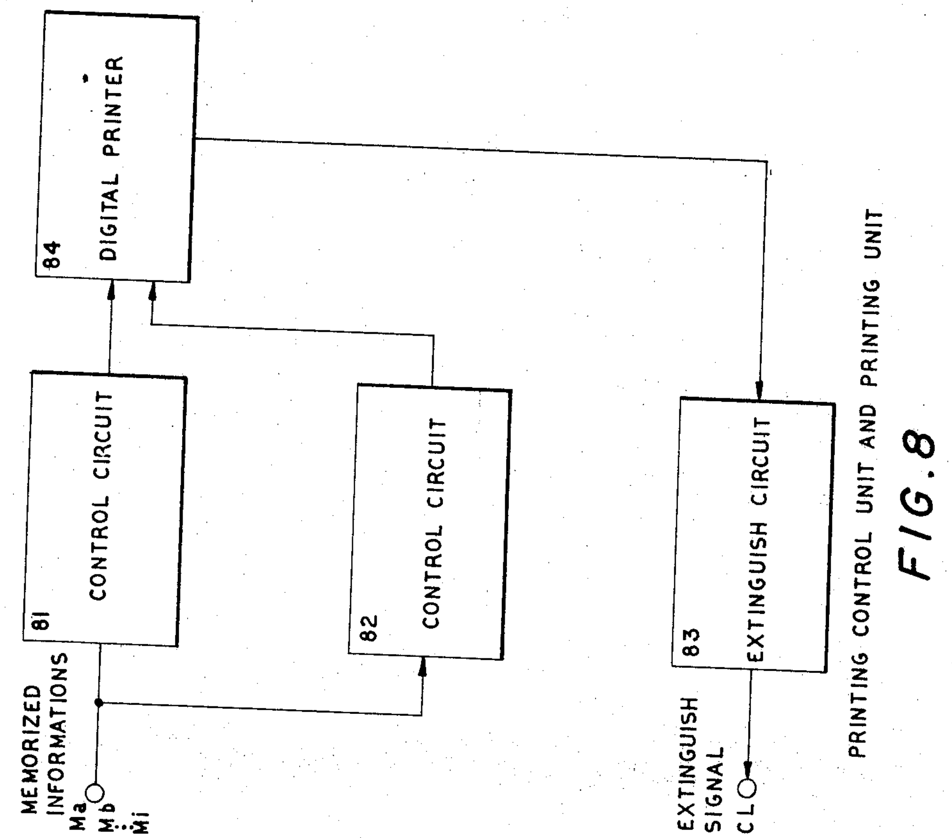
FIG. 8 is a block diagram of the printing control unit and printing unit shown in FIG. 1.

Referring to FIG. 8, there is shown the printing control unit 9 as comprising control circuits 81 and 82 and an extinguish circuit 83, and printing unit 10 as comprising a digital printer 84. Control circuit 81 is operative to convert the time information $M_a$ to $M_i$ which is stored in memory unit 8, to the code numbers as required by digital printer 84. Control circuit 82 is also operative to convert the information $M_a$ to $M_2$ from memory circuits 71 to 79 relating to the order of arrival, or course number, as the case may be, to the code numbers required by digital printer 84 thereby causing digital printer 84 to print out in order of arrival. Digital printer 84 is operative to record the times for the lap or goal in the order of arrival or course number as the case may be, for each competitor, taking approximately 0.25 second to print each line of the record. Extinguish circuit 83 is operative to generate a signal CL to erase the information stored in the memory circuit when the printing operation has been completed by digital printer 84.

Display unit 11 which is connected to control unit 4, is operative to count the time signals T' from gate circuit 31 and also to display the counted value. Display unit 11 is also operative to store the goal time for the first competitor when receiving signal G from scanning unit 3.

Figures 1, 8A:
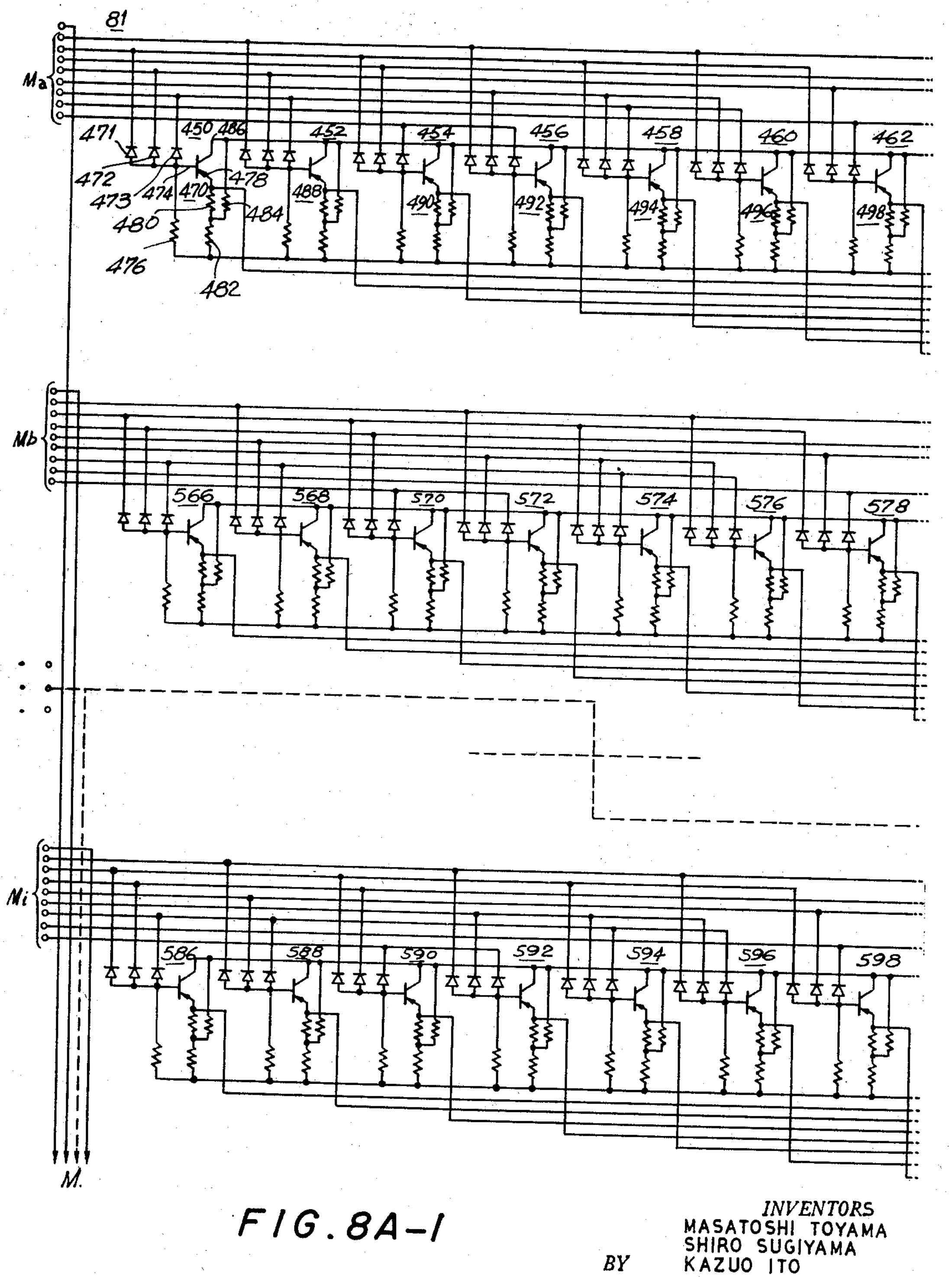
Figures 2, 8A:
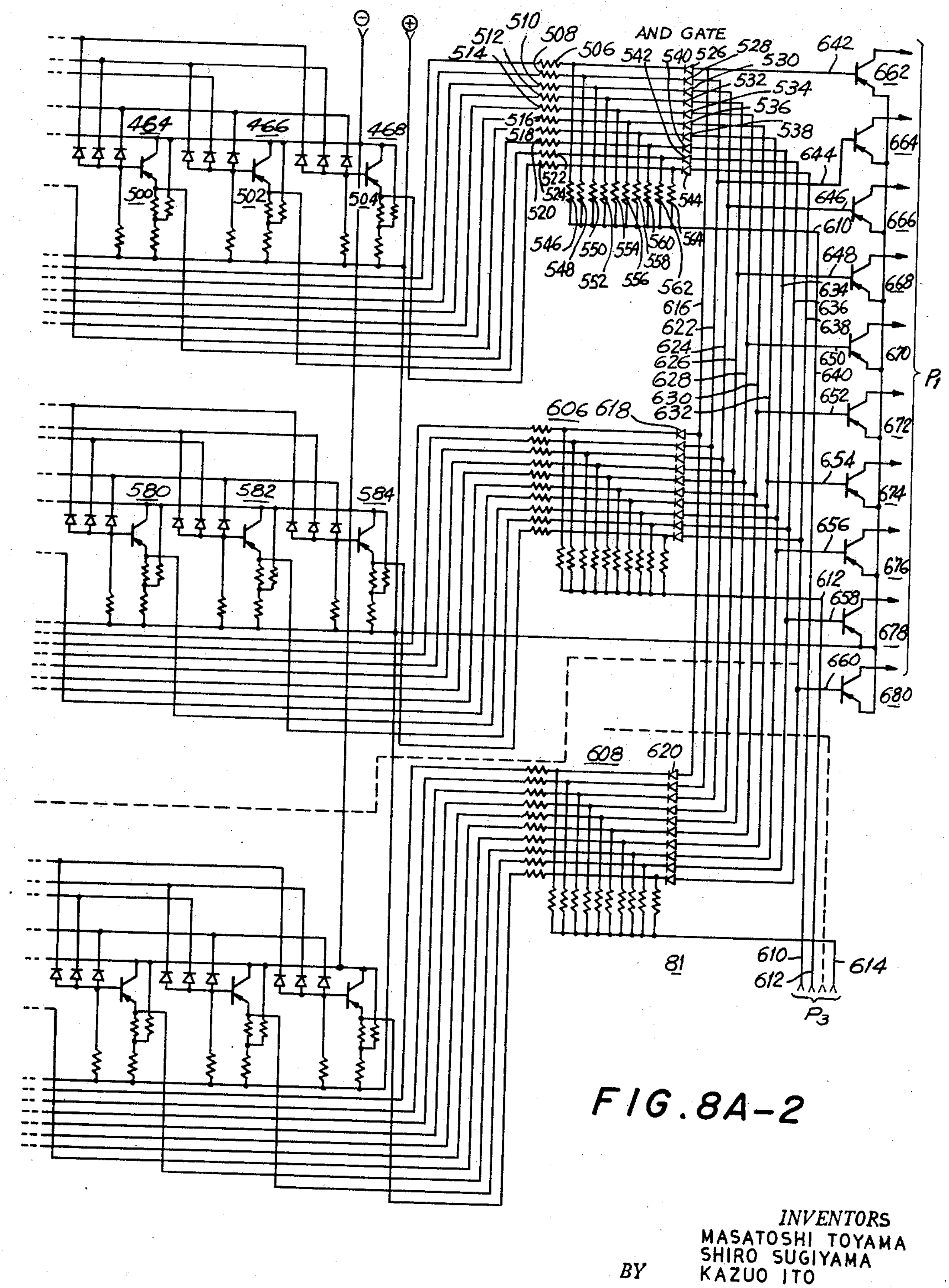

Referring to FIG 8A, there is shown a schematic diagram of control circuit 81 depicted in block diagram form in FIG. 8. Referring to FIG. 8A, and particularly to the portion thereof pertaining to input signals $M_a$ from memory circuit 71, control circuit 81 is seen to comprise a code converter portion including a series of code converter circuits 450, 452, 454 . . . 468. Code converter circuit 450 comprises a transistor 470 having input diodes 471, 472, and 473 having their anodes jointly connected to base 474 of transistor 470, and their respective cathodes connected to the corresponding output terminals of memory circuits 71. An input resistor 476 is connected to base 474, and emitter 478 has resistors 480 and 482, in series arrangement, connected between the emitter 478 and the other end of resistor 476. The junction of resistors 480 and 482 is connected by means of resistor 484 to collector 486 of transistor 470. Similarly code converter circuits 452, 454, 456 . . . 468, comprise transistors 488, 490, 482 . . . 504, which are arranged in a similar manner to transistor 470 of code converter circuit 450. The outputs of code converter circuits 450, 452 . . . 468, are taken from the respective emitters of transistors 470, 488, 490 . . . 504, and are applied to the AND GATE portion comprising resistors 506, 508, 510 . . . 524, in series respectively with diodes 526, 528, 530 . . . 544; with resistors 546, 548, 550 . . 564, being connected to the respective junctions of resistors 506 and diode 526, resistor 508 and diode 528, resistor 510 and diode 530 . . . resistor 524 and diode 544. In a similar fashion to that described above with respect to incoming signals $M_a$, the incombing signals $M_b$ are applied to code converter circuits 566, 568, 570 . . . 584; and the input signals $M_l$ are likewise applied to code converters circuits 586, 588, 590 . . . 604. As described above with respect to incoming signals $M_a$, the outputs of converter circuits 566, 568, 570 . . . 584, are applied to AND GATE portion 606; and the outputs of code converter circuits 586, 588, 590 . . . 604, are applied to AND gate portion 608.

Input signals $P_3$, corresponding to the order of arrival of competitors, or to the particular course information, as the case may be, are applied to AND gate portion 525 by means of lead 610, to which is connected gating resistors 546, 548 . . . 564. In a similar way, the input signals $P_3$ are connected to AND gate portion 606 by means of lead 612, and to AND GATE portion 608 by means of input lead 614. The cathodes of the first level of diodes in each of AND GATE portion 526, 606, 608, are connected together by means of lead 616. That is the cathode of diode 526, 618, and 620 are connected together by means of lead 616. Similarly, the cathode of diode 528, and the corresponding second level diodes are connected together by means of lead 622. Similarly, leads 624, 626, 628, 630, 632, 634, 636, 638, and 640 connect the anodes of the successive levels of diodes in the AND gate portions. Output leads 642, 644, 646 . . . 660, are respectively connected to the aforementioned leads 616, 622, 624, 626, 628 . . . 640, and thereby serve to apply the output of AND GATE portions 525, 606 . . . and 608, to power amplifiers 662, 664, 666 . . . 680, to thereby produce output signal $P_1$.

Figures 1, 8B:
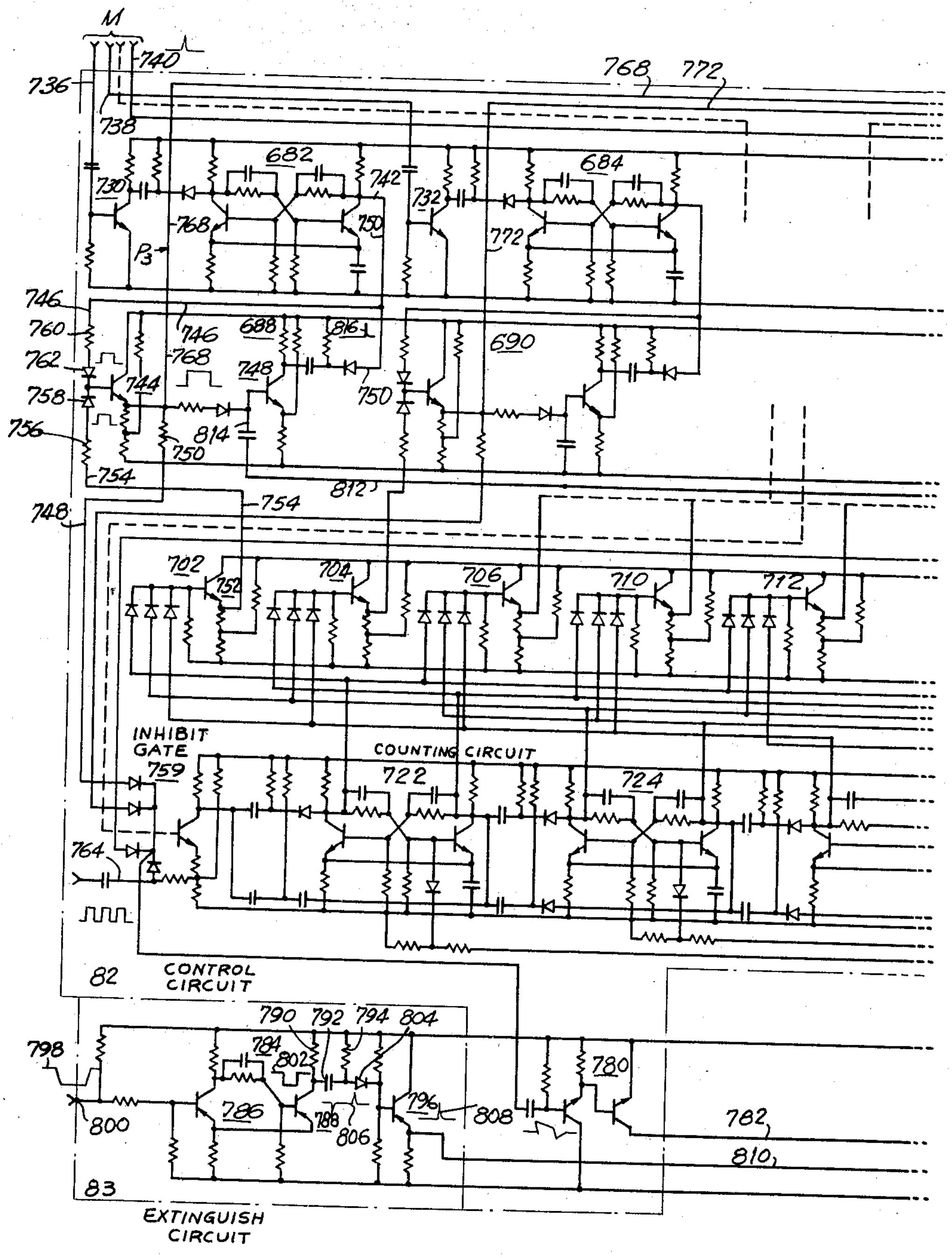
Figures 2, 8B:
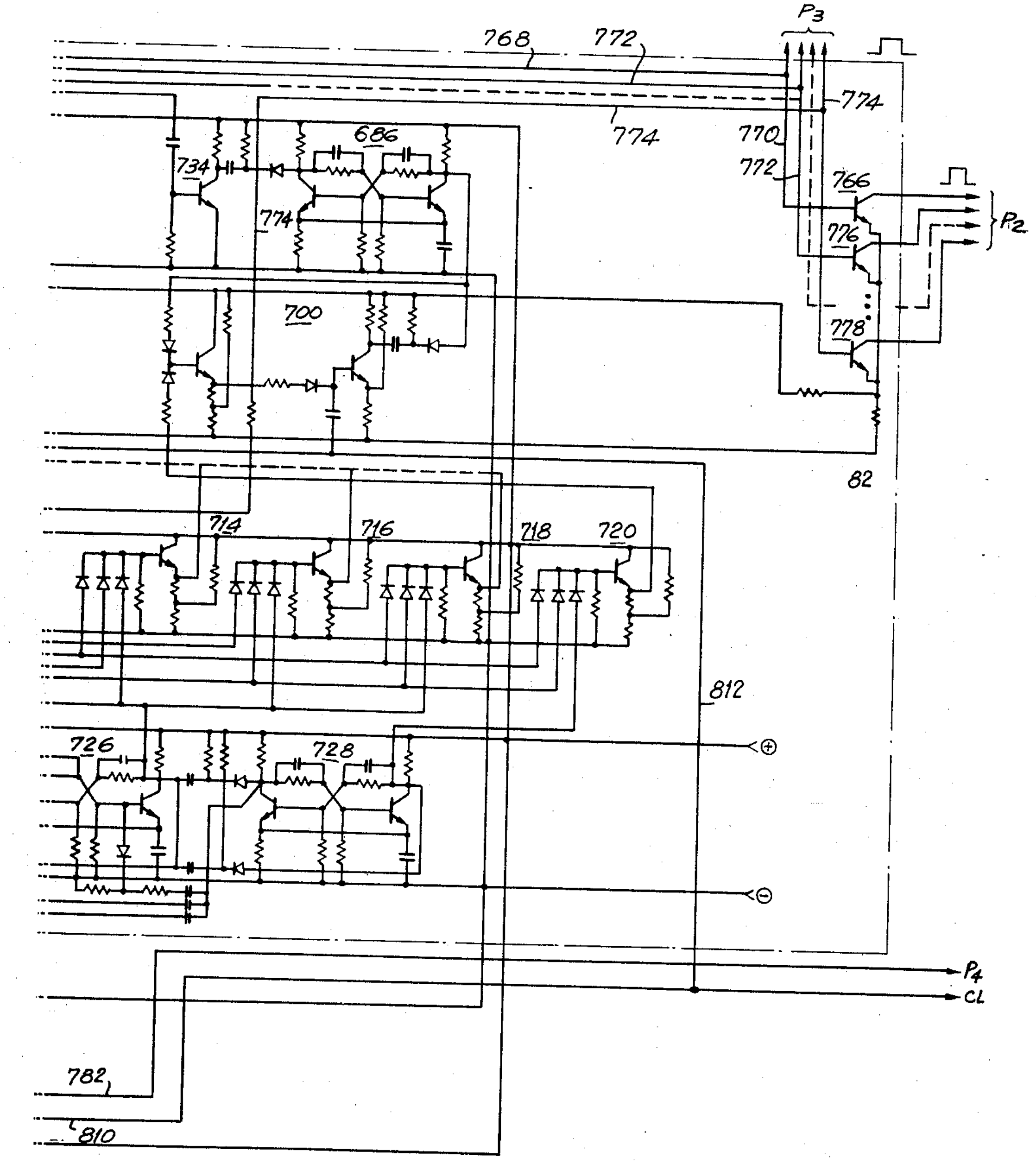

As shown schematically in FIG. 8B, control unit 82 comprises a series of bistable flip flop circuits 682, 684 . . . 686, having an input signal *m*. Control unit 82, further comprises a series of two stage AND GATE circuits 688, 690 . . . 700. As shown in FIG. 8B, control unit 82 further comprises a code converter portion including code converter circuits 702, 704, 706 . . . 720; and a counting circuit portion comprising binary flip-flops 722, 724, 726, and 728.

The operation of control circuit 82 is as follows. When one or more input signals *m* i.e. which may consist of signals $M_a$, $M_b$ . . . $M_l$, corresponding to the order of arrival of competitors or lane number, are applied to input transistors 730, 732 . . . 734, corresponding to bistable flip flops 682, 684 . . . 686 respectively, by means of input leads 736, 738 . . . 740. Accordingly, the appropriate bistable flip flop circuits 682, 684 . . . 686, are rendered into the ON condition. The output of flip flop circuit 682 is applied by lead 742 to first stage gating transistor 744 by means of input lead 746 and to second stage gating transistor 748 by means of lead 750. The output of code converter circuit 702 is taken from the emitter of transistor 752 by means of lead 754 and applied to the base input of first H transistor 744, through the series arrangement of resistor 756 and diode 758. Similarly, lead 746 connecting the output of flip flop 682, is connected to the serial arrangement of resistor 760 and diode 762 which is connected to the base of transistor 744.

A one kc. clock signal is applied to INHIBIT GATE 759 by means of input lead 764 so that the counting circuit portion comprising bistable flip flop circuit 722, 724, 726, and 728, count up these pulses. As described above, the code converter portion cyclically generates output signals and applies these signals to the first stage AND GATE circuit, as for example output lead 754 to input transistor 744. In response to the input signals provided by input leads 754 from the code converter circuit portion, and by input leads 746 from the bistable flip flop 682, for example, AND GATE circuit 688 generates an output signal which is applied to INHIBIT GATES 759 by means of lead 748 and resistor 750, whereby, the one kc. clock signal is initially inhibited, thereby causing the corresponding counting circuit to stop, and causing the first stage of AND GATE circuit 688 to remain in the OPEN condition. At the same time, output signal $P_3$ of the first stage of AND GATE circuit 688 is transmitted to power amplifier 766 by means of leads 768 and 770, in order to cause the order of arrival, or course number information to be printed, with power amplifier 766 generating an output signal $P_2$ as shown. Similarly, the output of the first stage of AND GATE circuits 690 . . . 700, are applied respectively by output leads 772, and 774, to power amplifiers 776 . . . to 778, to generate output signal $P_2$. As indicated above, in connection with the description of control circuit 81, output signal $P_3$ is applied to AND GATE circuits 525, 606, and 608 by means of input leads 610, 612, 614, respectively, in order to print the information provided by memory circuit 71–79, corresponding to the order of arrival, or course number, as the case may be. Furthermore, while the respective first stages of the AND GATE circuits 688, 690 . . . 700 are generating output signals $P_3$, two stage amplifier 780 generates an output signal $P_4$ at output lead 782 to provide the start of printing of the readout information.

As shown schematically in FIG. 8B, extinguish circuit 83 comprises a Schmitt trigger circuit 784 including transistors 786 and 788, a differentiation circuit comprising resistor 790, capacitor 792, and resistor 794; and an emitter follow circuit including transistor 796.

As shown in block diagram form in FIG. 8, output signal $P_5$ from digital printer 84, as indicated by waveform 798, is applied to extinguish circuit 83 at input terminal 800. Schmitt trigger circuit 784 provides a square waveform 802, at the collector output of transistor 788, which is then differentiated by means of resistor 790, capacitor 792, and resistor 794, after which the negative going spike of the resultant waveform 806 is clipped by diode 804, and is applied to the face of transistor 796, with the output, as indicated by positive going spike 808 being produced at the emitter terminal of transistor 796. Waveform 808 is taken from the emitter terminal of transistor 796 by means of output lead 810 to provide output pulse CL which is applied by means of lead 812 through capacitor 814 to the second stage of AND GATE 688 i.e. at the base terminal of transistor 748. The application of the output pulse CL, at the completion of the printing out, causes the second stage of AND GATE circuit 688 i.e. at transistor 748, to provide an output pulse indicated by waveform 816 which is applied to flip flop 682 by means of lead 750 to thereby return flip flop 682 from the ON condition to the OFF position. Consequently the first stage of AND GATE circuit 688, i.e. at transistors 744 is closed, INHIBIT GATE 759 is opened, and control circuit 82 is ready for the application thereto of the following arrival information, and repeats the operations described above.

Referring to FIG. 8C, there is shown schematically digital printer 84 which is depicted in block diagram form in FIG. 8. Digital printer 84 comprises a motor 818 which rotatably drives slit disc 820 through a clutch arrangement 822. Print wheels 824 and 826 are rotatably coupled to drive shaft 828 of motor 818. Input signals $P_1$ and $P_2$ are applied to wheel commutators 830 and 832 respectively which are coupled to pawl magnet 834 and 836 respectively, with print wheel 824 engaging pawl magnet 836, and print wheel 826 engaging pawl magnet 834. A phototransistor 838 is disposed in alignment with a lamp 840, in alignment with slit 842 of slit disc 820.

Digital printer 84 operates as follows. Upon the application of input signal P to input lead 844, which corresponds to the start of the printing operation, electromagnetic clutch 822 is energized thereby coupling the rotative drive provided by motor 818 to slit disc 820. When wheel commutator 832 reaches the input signal $P_2$, corresponding to the order of arrival or course number as the case may be, and wheel commutator 830 reaches the input signal $P_1$, pawl magnets 836 and 834 respectively stop print wheels 824 and 826 respectively to print the information on recording paper by means of puncher 846. Furthermore, the rotation of slit disc 820 causes a series of light pulses, whereby the light being provided by lamp 840 is interrupted by slit disc 820 from the start to the completion of the printing, thereby generating output pulse $P_5$ on output lead 848.

Figure 9A:
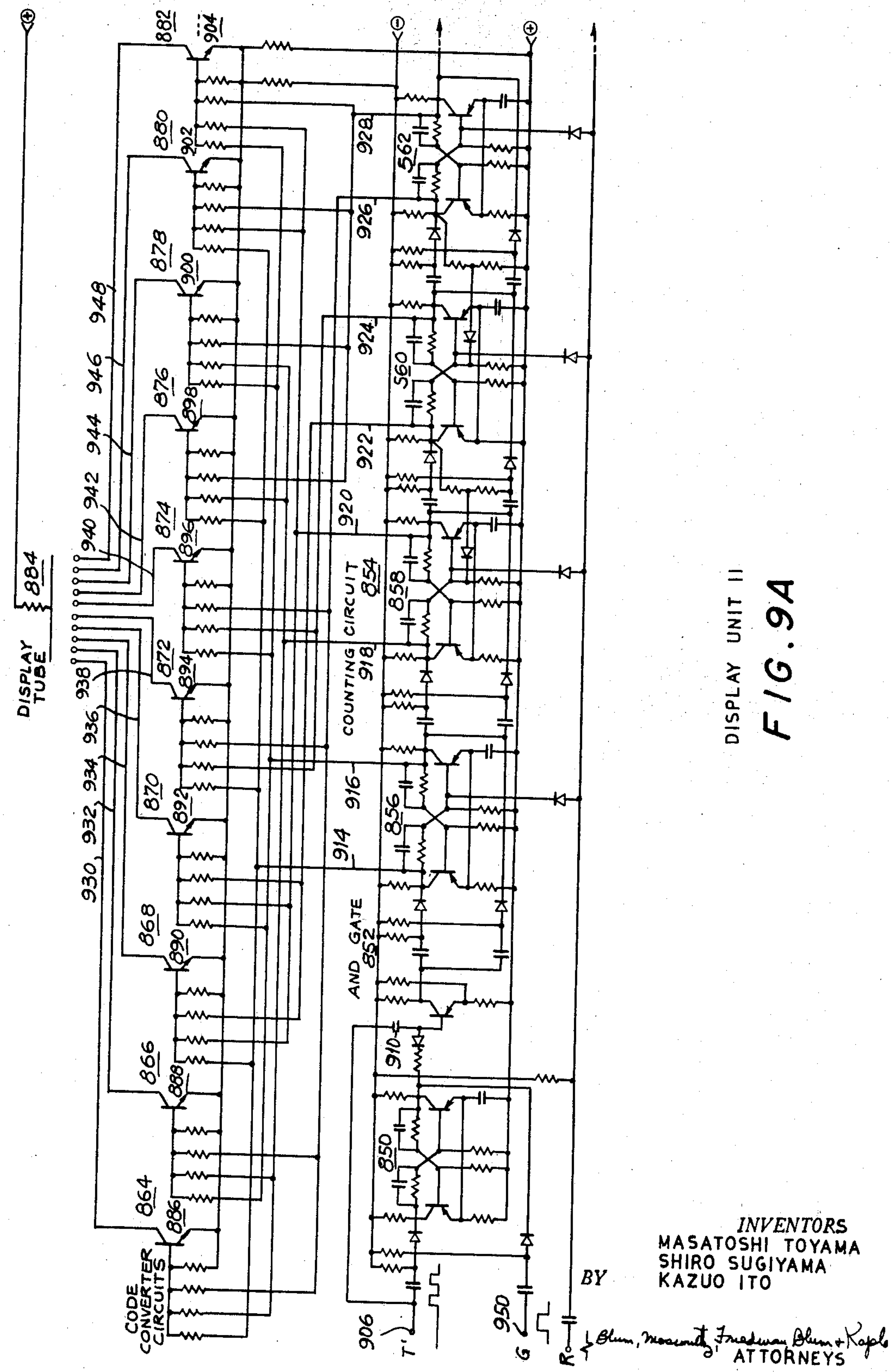
FIG. 9A is a schematic circuit of the display unit shown in FIG. 1.

Display Unit 11 shown in block diagram form in FIG. 1 is depicted schematically in FIG. 9A, as comprising a bistable flip flop circuit 850, AND GATE circuit 852, and a counting circuit 854 including bistable flip flop circuits 856, 858, 860 and 862. Display unit 11 further comprises a code converter portion including converter circuits 864, 866, 868, 870, 872, 874, 876, 878, 880, and 882, whose respective outputs are connected to the electrodes of display tube 884. Code converter circuits 864, 868 . . . 882, respectively include transistors 886, 888 . . . 904. Time signal T which originates from GATE circuit 31 in the control unit, is applied at input terminal 906 to flip flop circuit 850, and to AND GATE circuit 852 by means of lead 908 and coupling capacitor 910 to the base terminal of transistor 912. When flip flop circuit 850 is rendered into the ON condition, AND GATE circuit 852 is opened to thereby transmit Time Signal T′ from the collector terminal of transistor 912 to counting circuit 854 comprising flip flop circuits 856, 858, 860 and 862. The output of counting circuit 854 is taken from the collector terminals of the respective switching transistors in flip flop circuits 856, 858, 860, 862, by means of output terminals 914 and 916, 918, 920, 922, 924, 926, 928, respectively, to be applied to code converter circuits 886, 888, 890, 892, 894, 896, 898, 900, 902, 904, whereby the code converter portion codifies the counting values provided by counting circuit 854. The counting values provided by counting circuit 854 are also displayed on display tube 884 by means of output leads 930, 932, 934 . . . 948, which respectively interconnect the collectors of transistors 886, 888, 890 . . . 904, respectively with the corresponding electrodes in display tube 884. In the actual display unit which may comprise decimal or hexanal counting circuits, the code converter circuits and display tubes, as shown in FIG. 9A are connected in cascade, thereby enabling the display of time information arranging, for example, from 0.01 second to 10 hours.

Furthermore, when flip flop circuit 850 has applied thereto goal signal G at input terminal 950, corresponding to the first arrival, as provided by waveform circuit 27′ in the scanning unit, flip flop circuit 850 is rendered into the OFF condition, and AND GATE circuit 852 closes. As the Time Signal T′ is not transmitted to counting circuits 854 because AND GATE circuit 852 is closed, display tube 884 will continue to display the counting value at the instant of the application of input signal G at input terminal 950 i.e. the goal time.

The control circuits described above use temperature compensated transistor circuits thereby providing a high speed and high efficiency timing system.

Since printing takes place only after the results of the sporting event have been stored in the memory unit 8, deficiencies normally encountered in the case of direct printing from the mechanical counting unit are avoided.

With the time measuring system of the present invention as described above, a timing accuracy of one thousandths of a second may be obtained, and while the recording accuracy may be in the order of hundredths of a second this may be reduced to the order of a thousandth of a second, by adding suitable components to the memory circuits and the digital printer.

Since the scanning unit 13 and the quartz oscillators 5 are directly connected to clock 12 and photo finish equipment 13, similar accuracies are obtainable with spectators clock 12 and photo finish equipment 13.

The sequence of operation of the above timing system in a sporting event is as follows:

Generator 1, upon being energized for example, by a starter pistol having electrical contacts, provides a signal S to indicate the start of the race, the signal S being applied to scanning unit 3 and thence to control unit 4. Upon the application of the start signal S, counting unit 6 starts to count the time signals T from quartz crystal oscillator 5, and accordingly spectators clock 12 starts to run indicating the elapsed time since the start of the race. Photo finish equipment 13 is also brought into operation at the same time.

Figures 1A, 1B:
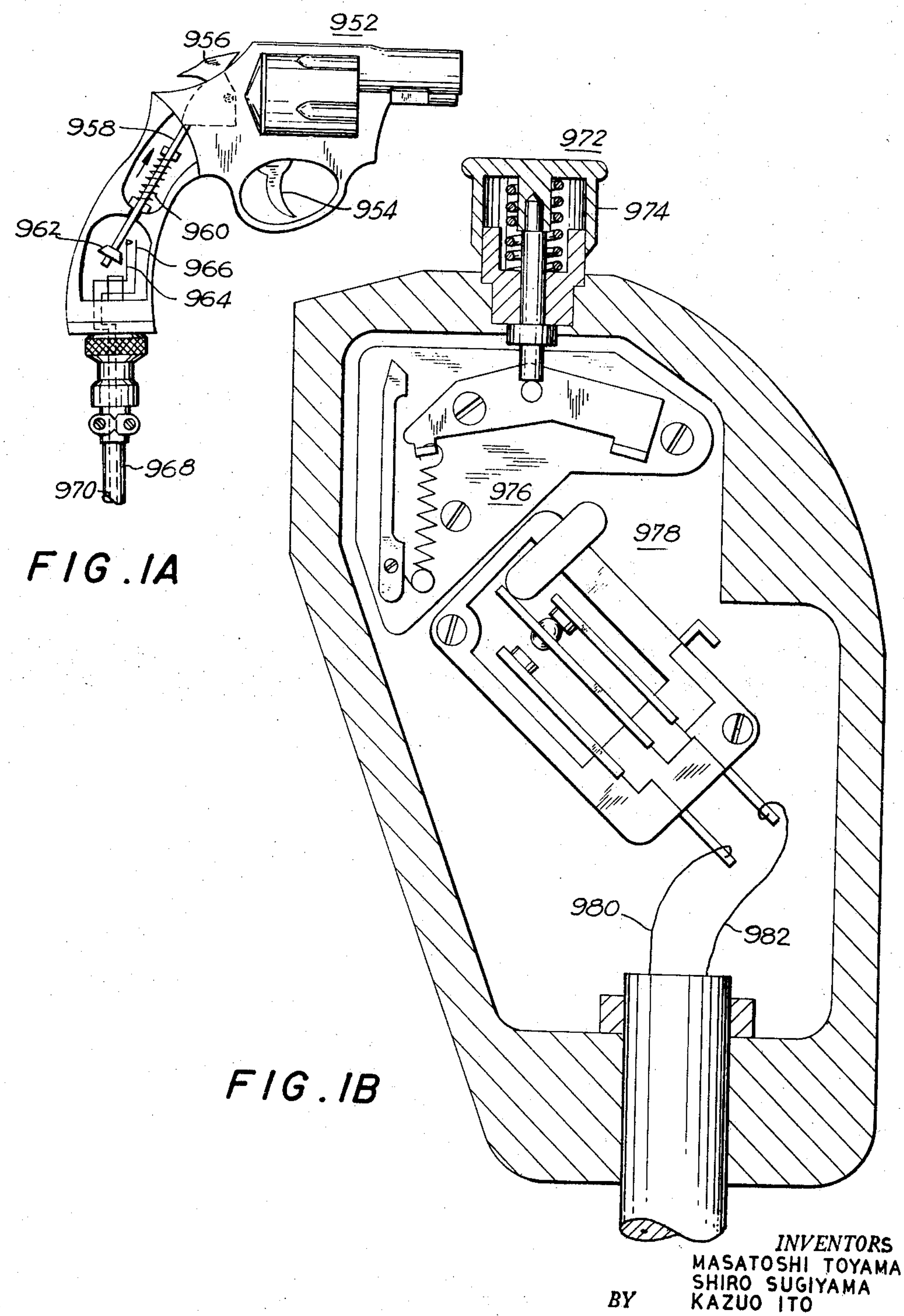
FIG. 1A depicts in partial sectional view a starting pistol suitable for use with the timing system of the present invention.
FIG. 1B depicts in sectional view a grip switch suitable for use with the timing system of the present invention.

FIG. 1A depicts a starting pistol 952, which may be utilized for indicating the start of the race to the competitors, while electrically generating the Start Signal S. Thus when the official presses the trigger 954, the hammer 956 is displaced thereby allowing spring loaded piston rod 958 to move upwardly under the spring force of spring 960. As rod 958 moves upwardly in the direction indicated by the arrow, projection 962 will strike movable contact 964, and bring movable contact 964 into contact with stationary contact 966 thereby closing the circuit comprising leads 968 and 970 to provide the generation of the output pulse signal S by means of generator 1.

FIG. 1B depicts a grip switch 972, comprising a spring loaded push button 974, for actuating a spring loaded lever arrangement 976, in order to actuate electrical contact assembly 978, to thereby close the circuit comprised in part by output leads 980 and 982. Thus when the timekeeper depresses push button 974 of grip switch 972, at the instant of the start of a race, or completion of a lap, or the occurance of a goal, contact assembly 978 is actuated causing the circuit of leads 980 and 982 to be closed and thereby cause the generation of output signal $G_a$, $G_b$, . . . or $G_i$. Additionally, a photoelectric device, or a touching plate, may be used in generator 1 or 2, in order to generate the output signal by virtue of the contact of electrical contacts or a photo electronic signal.

In the case of a track race, when the competitors pass the lap line, where generators, for example the photoelectric device, is situated, scanning unit 3 receives one of the signals $G_a$ to $G_i$ provided by the photoelectric device, for each competitor. Scanning unit 3 provides one of the signals $G_a'$ to $G_i'$ to control unit 4 which is set to "non-course" and connected to counting unit 6, memory control unit 7, memory unit 8, printing control unit 9 and printing unit 10. Accordingly, the lap times, which are the values $C_1$ to $C_7$ provided by counting unit 6 corresponding to the respective times that each competitor passes the lap line, are recorded in the order of arrival on print paper by digital printer 84. Concurrently, clock 12 causes its split second hand to stop for a reselected time e.g. 10 or 15 seconds, from the moment when the first competitor crosses the lap line, to generate the signal L which is applied through waveform circuit 23*i*, buffer circuit 24, mixer circuit 25, switch 26 which has been preset, and waveform circuit 27. Thus, as the competitors cross the goal line of the race track, the finish times are recorded in the order of arrival on the print paper by the digital printer 84. Display unit 11 is then stopped for the first competitor by the signal G which passes through preset switch circuit 26′, and thence through waveform circuit 27′. Clock 12 also stops its time indicator for the first competitor upon the application thereto of the signal G.

When control unit 4 is preset to "course," as in swimming events, generator 2 which may comprise grip switches, generates the lap or goal signals $G_a$ to $G_i$ for each competitor. In this case the signals $G_a$ to $G_i$ pass through scanning unit 3 and control unit 4 with the digital printer 84 recording the lap or goal times together with the course numbers. Display unit 11, clock 12 and photofinish equipment 13 are operative in a manner similar to that described above in the case of a "non-course" sporting event.

While there has been shown a particular embodiment of the present invention, it will be understood that it is not wished to be limited thereto, since modifications can be made both in the circuit arrangement and in the instrumentalities employed, and it is contemplated in the appended claims to cover any such modifications as fall within the true spirit and scope of the invention.

What is claimed is:

1. A timing and display system for sports events comprising, signal generator means for providing electrical signals corresponding to the beginning of a sports event and time significant events occurring during the course of said sports event, display means including an electric spectator clock for displaying the times of occurrence of various time significant events occurring during the course of said sports event, a high stability oscillator for providing clock pulses to drive said electric clock, scanning means connected to the output of said signal generator means and to the input of said display means, said scanning means being operative to convert said signals provided by said generator means into electrical signals of proper waveform for application to said display means, counting means for counting elapsed times for the various time significant events in said sports event, control means connected to the output of said scanning means for selectively applying the electrical signals provided by said scanning means to said counting means, said oscillator having its output connected to said electric display clock and said control means, memory means having its input connected to said control means and the output of said counting means, said memory means being operative to store the elapsed time information provided by said counting means, and printing means for printing out the elapsed time information stored in said memory means.

2. A timing and display system for sports events as defined in claim 1, wherein, said signal generator means comprises a first generator for providing an electrical start signal at the instant of starting of said sports event, and a second generator for providing electrical lap and goal signals corresponding to the time of occurrence of time significant events occurring during the course of, and at the finish, of said sports event, respectively.

3. A timing and display system as defined in claim 2 wherein said first generator includes a starting pistol having a pair of electrical contacts which are closed at the instant of firing to indicate the starting of said sports event, and said second generator includes photoelectric means for detecting the passing therepast of a competitor during the course of said sports event.

4. A timing and display system as defined in claim 2 wherein said second generator includes a gripswitch for detecting the instant of arrival of a competitor in said sports event.

5. A timing and display system as defined in claim 2 wherein there is further included photo-finish means operative upon the application thereto of an electrical signal provided by said second generator, to photographically record the termination of said sports event.

6. A timing and display system as defined in claim 2 wherein said memory means is operative to sequentially store the signals provided by said counting means in order of occurrence.

7. A timing and display system as defined in claim 6 wherein said printing means is operative to sequentially print out said information stored in said memory means in the order in which said information was stored.

8. A timing and display system as defined in claim 6 wherein said memory means is operative to store course identifying information together with the time information provided by said counting means.

9. A timing and display system defined in claim 2 wherein said scanning means is operative to momentarily stop said electric clock upon the application thereto of said lap and goal signals.

References Cited

UNITED STATES PATENTS

| | | | |
|---|---|---|---|
| 2,396,017 | 3/1946 | Martin | 35—25 |
| 2,566,078 | 8/1951 | Bliss | 346—33 |

MAYNARD R. WILBUR, Primary Examiner

J. M. THESZ, Assistant Examiner

U.S. Cl. X.R.

340—323; 346—80